United States Patent
Liang et al.

(10) Patent No.: US 12,052,588 B2
(45) Date of Patent: Jul. 30, 2024

(54) UE MIGRATION METHOD, APPARATUS, SYSTEM, AND STORAGE MEDIUM

(71) Applicant: ZTE Corporation, Shenzhen (CN)

(72) Inventors: Shuang Liang, Shenzhen (CN); Zhijun Li, Shenzhen (CN); Jinguo Zhu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 479 days.

(21) Appl. No.: 17/214,581

(22) Filed: Mar. 26, 2021

(65) Prior Publication Data

US 2022/0014944 A1    Jan. 13, 2022

Related U.S. Application Data

(63) Continuation of application No. PCT/CN2019/108574, filed on Sep. 27, 2019.

(30) Foreign Application Priority Data

Sep. 27, 2018   (CN) .......................... 201811134224.6

(51) Int. Cl.
*H04W 24/04* (2009.01)
*H04W 76/18* (2018.01)

(52) U.S. Cl.
CPC ............ *H04W 24/04* (2013.01); *H04W 76/18* (2018.02)

(58) Field of Classification Search
CPC ..... H04W 24/04; H04W 76/18; H04W 76/25; H04W 76/19; H04W 80/01
See application file for complete search history.

(56) References Cited

U.S. PATENT DOCUMENTS

| | | | | |
|---|---|---|---|---|
| 2018/0199243 | A1* | 7/2018 | Bharatia | ........... H04W 36/0066 |
| 2020/0178062 | A1* | 6/2020 | Bartolomé Rodrigo | ..................... H04W 60/04 |
| 2021/0243678 | A1* | 8/2021 | Drevon | .................. H04W 48/02 |
| 2021/0306211 | A1* | 9/2021 | Landais | .................. H04L 43/20 |

FOREIGN PATENT DOCUMENTS

| | | | |
|---|---|---|---|
| CN | 105577408 A | 5/2016 | |
| CN | 106332149 A | 1/2017 | |
| CN | 106664216 A | 5/2017 | |

(Continued)

OTHER PUBLICATIONS

Chinese Office Action with English Translation for Chinese Patent Application No. 201811134224.6 dated Nov. 21, 2022, 8 pages.

(Continued)

*Primary Examiner* — Kibrom T Hailu
(74) *Attorney, Agent, or Firm* — Crowell & Moring LLP

(57) ABSTRACT

Provided are a UE migration method, apparatus and system and a storage medium. An NF that establishes a signaling interaction with an active SMF acquires a link state between the NF and the active SMF; the NF sends an SMF failure notification message to a standby SMF in response to determining that the active SMF fails; and the standby SMF migrates a UE to be migrated on the active SMF to the standby SMF according to a received SMF failure notification message. Further provided is a method for restoring UEs on a failed SMF to a standby SMF in batches.

18 Claims, 11 Drawing Sheets

(56) References Cited

FOREIGN PATENT DOCUMENTS

| CN | 107018542 A | 8/2017 |
|---|---|---|
| CN | 108347727 A | 7/2018 |
| CN | 108462735 A | 8/2018 |
| WO | WO 2018/137866 A1 | 8/2018 |

OTHER PUBLICATIONS

3GPP TSG-SA WG2 Meeting #128-BIS, S2-187984, Convida Wirelss LLC, "Clarifications to UE Location Information", Aug. 14, 2018, 4 pages.
3GPP TSG CT WG4 Meeting #85bis, C4-185abc, Huawei, "Pseudo-CR on SMF/UPF Failure/Restart Detection", Jun. 29, 2018, 2 pages.
3GPP TSG CT WG4 Meeting #85bis C4-185177, Nokia et al., "Heartbeat procedure", Jun. 29, 2018, 20 pages.
Extended European Search Report for European Patent Application No. 19866085.4 dated May 31, 2022, 10 pages.
Nokia et al: "Heartbeat procedure", 3GPP Draft; C4-185177, 3rd Generation Partnership Project (3GPP), Mobile Competence Centre ; 650, Route Des Lucioles; F-06921 Sophia-Antipolis Cedex; France vol. CT WG4, No. Sophia Antipolis, France; Jul. 9, 2018-Jul. 13, 2018 Jun. 29, 2018 (Jun. 29, 2018), XP051472290, Retrieved from the Internet: URL:http://www.3gpp.org/ftp/tsg%5Fct/WG4%5Fprotocollars%5Fex%2DCN4/TSGCT4%5F85bis%5FSophia%5FAntipolis/Docs [retrieved on Jun. 29, 2018].
Nokia et al: "Detecting NF (e.g. SMF) Failure and Restart using the NRF", 3GPP Draft; C4-186296, 3rd Generation Partnership Project (3GPP), Mobile Competence Centre ; 650, Route Des Lucioles; F-06921 Sophia-Antipolis Cedex; France vol. CT WG4, No. West Palm Beach, US; Aug. 20, 2018-Aug. 24, 2018 Aug. 10, 2018 (Aug. 10, 2018), XP051574926, Retrieved from the Internet: URL:http://www.3gpp.org/ftp/tsg%5Fct/WG4%5Fprotocollars%5Fex%2DCN4/TSGCT4%5F86%5FPalm%5FBeach/Docs/C4%2D186296%2Ezip [retrieved on Aug. 10, 2018].
Zte et al: "TS 23.502: N2 based handover", 3GPP Draft; S2-177634 TS23.502 N2 Based Handover-CH, $3^{rd}$ Generation Partnership Project (3GPP), Mobile Competence Centre ; 650, Route Des Lucioles ; F-06921 Sophia-Antipolis Cedex ; France vol. SA WG2, No. Ljubljana, Slovenia; Oct. 23, 2017-Oct. 27, 2017 Oct. 30, 2017 (Oct. 30, 2017), XP051360288, Retrieved from the Internet: URL:http://www.3gpp.org/ftp/tsg_sa/WG2_Arch/TSGS2_123_Ljubljana/Docs/ [retrieved on Oct. 30, 2017].
International Search Report and Written Opinion with English Translation for International Patent Application No. PCT/CN2019/108574 dated Dec. 27, 2019; 8 pages.
Nokia, "GUTI unique across AMFs in an AMF SET", 3GPP TSG-SA WG2 Meeting #126, S2-182963 notes, Relevant section: Section 5.21.2.3 and 6.3.5, Montreal, Canada, Mar. 2, 2018; 9 pages.
Canadian Office Action for Canadian Patent Application No. 3,114,150 dated Aug. 29, 2023, 4 pages.
Japanese Office Action with English Translation for Japanese Patent Application No. 2021-517185 dated Aug. 14, 2023, 10 pages.
3GPP TS 23.527 V15.0.0, 3rd Generation Partnership Project; Technical Specification Group Core Network and Terminals; 5G System; Restoration Procedures (Release 15), https://portal.3gpp.org/desktopmodules/Specifications/SpecificationDetails.aspx?specificationId=3349, Sep. 22, 2018, 16 pages.
3GPP TS 23.502 V15.3.0, 3rd Generation Partnership Project; Technical Specification Group Services and System Aspects; Procedures for the 5G System; Stage 2 (Release 15), 3GPP TS23.502 V15.3.0, https://portal.3gpp.org/desktopmodules/Specifications/SpecificationDetails.aspx?specificationId=3145, Sep. 17, 2018, 330 pages.

* cited by examiner

UE MIGRATION METHOD, APPARATUS, SYSTEM, AND STORAGE MEDIUM

CROSS-REFERENCE TO RELATED APPLICATION

This application is a continuation application of PCT International Patent Application No. PCT/CN2019/108574, filed with the China National Intellectual Property Administration, PRC on Sep. 27, 2019 which claims priority to Chinese Patent Application No. 201811134224.6, filed with the China National Intellectual Property Administration, PRC on Sep. 27, 2018, each of which is incorporated herein by reference in their entireties.

TECHNICAL FIELD

The present application relates to, but is not limited to, the field of communications, and for example, relates to, but is not limited to, a UE migration method, apparatus and system and a storage medium.

BACKGROUND

The 3rd Generation Partnership Project (3GPP) is currently conducting researches on the 5th Generation (5G) system. As defined by the 3GPP standard working group, the 5G system includes a radio subsystem, a 5G Radio Access Network (5G RAN) system, and a 5G core network subsystem, a 5G core network (5GC).

FIG. 1 is a diagram of an architecture of a 5G system, where the 5G system consists of several Network Functions (NFs). The 5G radio subsystem mainly includes a New Radio (NR) base station. The 5G core network subsystem mainly includes a Unified Data Management (UDM) function, an Access and Mobility Management Function (AMF), a Session Management Function (SMF), a User Plane Function (UPF) and a Policy Control Function (PCF). The UDM function is permanent storage for subscriber subscription data and located at a home network for subscriber subscription. The AMF manages requirements for users to access the network and is responsible for management of signaling from terminals to a non-access stratum (NAS) of the network, user mobility management and other functions. The Session Management Function (SMF) manages Packet Data Unit (PDU) sessions and Quality of Service (QoS) flows of the users, formulates packet detection and forwarding rules for the UPF, and the like. The UPF is responsible for the routing and forwarding of IP data and non-IP data, usage reporting and the like.

The PCF provides policy rules at various levels for the AMF and the SMF.

A Data Network (DN) is, for example, operator services, network access or third party services.

An Application Function (AF) manages AF sessions.

In the related art, a current failure of a certain NF, especially the SMF, will directly result in a failure of the corresponding PDU session and a failure to normally transmit uplink and downlink data of a UE. In this case, only when the UE initiates the transmission of uplink data, can the failure of the SMF be detected and the PDU session be restored. However, if downlink data is sent to the UE at the time of the failure of the SMF, the restoration of a PDU cannot be triggered and the delivery of the downlink data will fail.

SUMMARY

The embodiments of the present application provide a UE migration method, apparatus and system and a storage medium which can avoid the case where a failure of an SMF results in a failure of a PDU session and a failure to normally transmit uplink and downlink data of a UE in the related art.

An embodiment of the present application provides a UE migration method including steps described below. A Network Function (NF) acquires a link state between the NF and an active Session Management Function (SMF), where the NF is an NF that establishes a signaling interaction with the active SMF. The NF sends an SMF failure notification message to a standby SMF in response to determining that the active SMF fails, where the SMF failure notification message is used for triggering the standby SMF to migrate a UE on the active SMF to the standby SMF.

An embodiment of the present application further provides a UE migration method including steps described below. A standby SMF receives an SMF failure notification message sent by an NF in response to the NF determining that an active SMF fails, where the NF is an NF that establishes a signaling interaction with the active SMF. The standby SMF migrates a UE on the active SMF to the standby SMF.

An embodiment of the present application further provides a UE migration method including steps described below. An NF acquires a link state between the NF and an active SMF, where the NF is an NF that establishes a signaling interaction with the active SMF. The NF sends an SMF failure notification message to a standby SMF in response to determining that the active SMF fails. The standby SMF migrates a UE on the active SMF to the standby SMF in response to receiving the SMF failure notification message.

An embodiment of the present application further provides a user equipment (UE) migration apparatus which is applied to an NF that has a signaling interaction with an SMF and includes an acquisition module and a sending module. The acquisition module is configured to acquire a link state between the NF and an active SMF. The sending module is configured to send an SMF failure notification message to a standby SMF in response to determining that the active SMF fails, where the SMF failure notification message is used for triggering the standby SMF to migrate a UE on the active SMF to the standby SMF.

An embodiment of the present application further provides a user equipment (UE) migration apparatus which is applied to a standby SMF and includes a receiving module and a migration module. The receiving module is configured to receive an SMF failure notification message sent by an NF in response to the NF determining that an active SMF fails, where the NF is an NF that establishes a signaling interaction with the active SMF. The migration module is configured to migrate a UE on the active SMF to the standby SMF.

An embodiment of the present application further provides a user equipment (UE) migration system including an NF and a standby SMF. The NF is an NF that has a signaling interaction with an SMF. The NF is configured to acquire a link state between the NF and an active SMF and send an SMF failure notification message to the standby SMF in response to determining that the active SMF fails, where the SMF failure notification message is used for triggering the standby SMF to migrate a UE on the active SMF to the standby SMF. The standby SMF is configured to receive the SMF failure notification message sent by the NF in response to the NF determining that the active SMF fails and migrate the UE on the active SMF to the standby SMF.

An embodiment of the present application further provides an NF including a first processor, a first memory and a first communication bus. The first communication bus is configured to implement connections and communications between the first processor and the first memory. The first processor is configured to execute one or more programs stored in the first memory to implement steps of the preceding UE migration method applied to the NF.

An embodiment of the present application further provides a standby SMF including a second processor, a second memory and a second communication bus. The second communication bus is configured to implement connections and communications between the second processor and the second memory. The second processor is configured to execute one or more programs stored in the second memory to implement steps of the preceding UE migration method applied to the standby SMF.

An embodiment of the present application further provides a user equipment (UE) migration system including a third processor, a third memory and a third communication bus. The third communication bus is configured to implement connections and communications between the third processor and the third memory. The third processor is configured to execute one or more programs stored in the third memory to implement steps of the preceding UE migration method applied to the system.

An embodiment of the present application further provides a computer-readable storage medium storing one or more programs, where the one or more programs are executable by one or more processors to implement steps of any one of the preceding UE migration methods.

DETAILED DESCRIPTION

Figure 1:
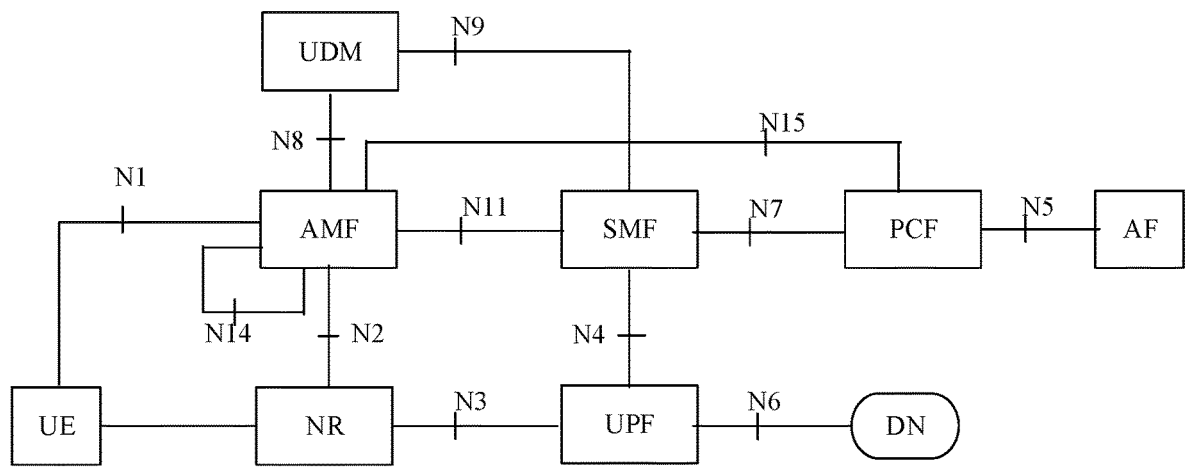
FIG. 1 is a diagram of an architecture of a 5G system in the related art.
Figure 2:
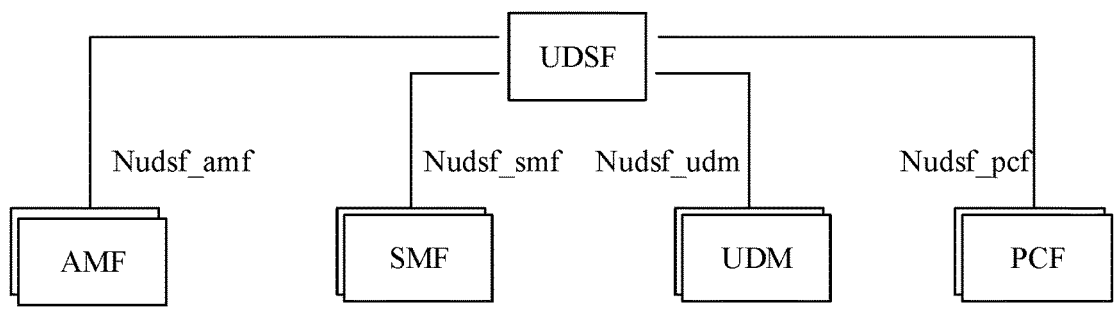
FIG. 2 is a schematic diagram illustrating that a UDSF supports a stateless design of different types of NFs according to the present application.

In the related art, a 5G network supports a stateless design of NFs. The stateless design means that NFs of the same type that serve a UE, such as AMFs, may be replaced in two former and latter processes. To ensure that a process can be normally executed after the NF is replaced, context information of the UE needs to be stored on an Unstructured Data Storage Function (UDSF). Moreover, the NFs of the same type such as the AMFs are guaranteed to be able to mutually access the context information of the UE on the UDSF. Different types of NFs cannot mutually access the context information of the UE on the UDSF in principle. FIG. 2 is a schematic diagram illustrating that the UDSF supports the stateless design of different types of NFs such as the AMF, an SMF, a UDM and a PCF. Different types of NFs access the context of the UE on the UDSF via different interfaces.

Based on the stateless design of NFs, a capability is provided: when a certain NF fails, an NF of the same type can take over the process of the failed NF based on the context of the UE on the UDSF.

However, no standardized solution has been proposed for NF switching at the time of an NF failure, especially for the migration of a PDU session of the UE to another SMF after an SMF fails, which basically depends on the implementation of a specific product. For example, active and standby NFs that are interchangeable detect each other and initiate the migration of the PDU session of the UE. Therefore, a method for migrating the UE on a failed SMF when the SMF fails is urgently needed.

It should be noted that in the related art, the UE registers with the 5G network and initiates processes related to PDU session establishment to the 5G network. Through these processes, the UE can obtain a packet data service from the 5G network.

Figure 3:
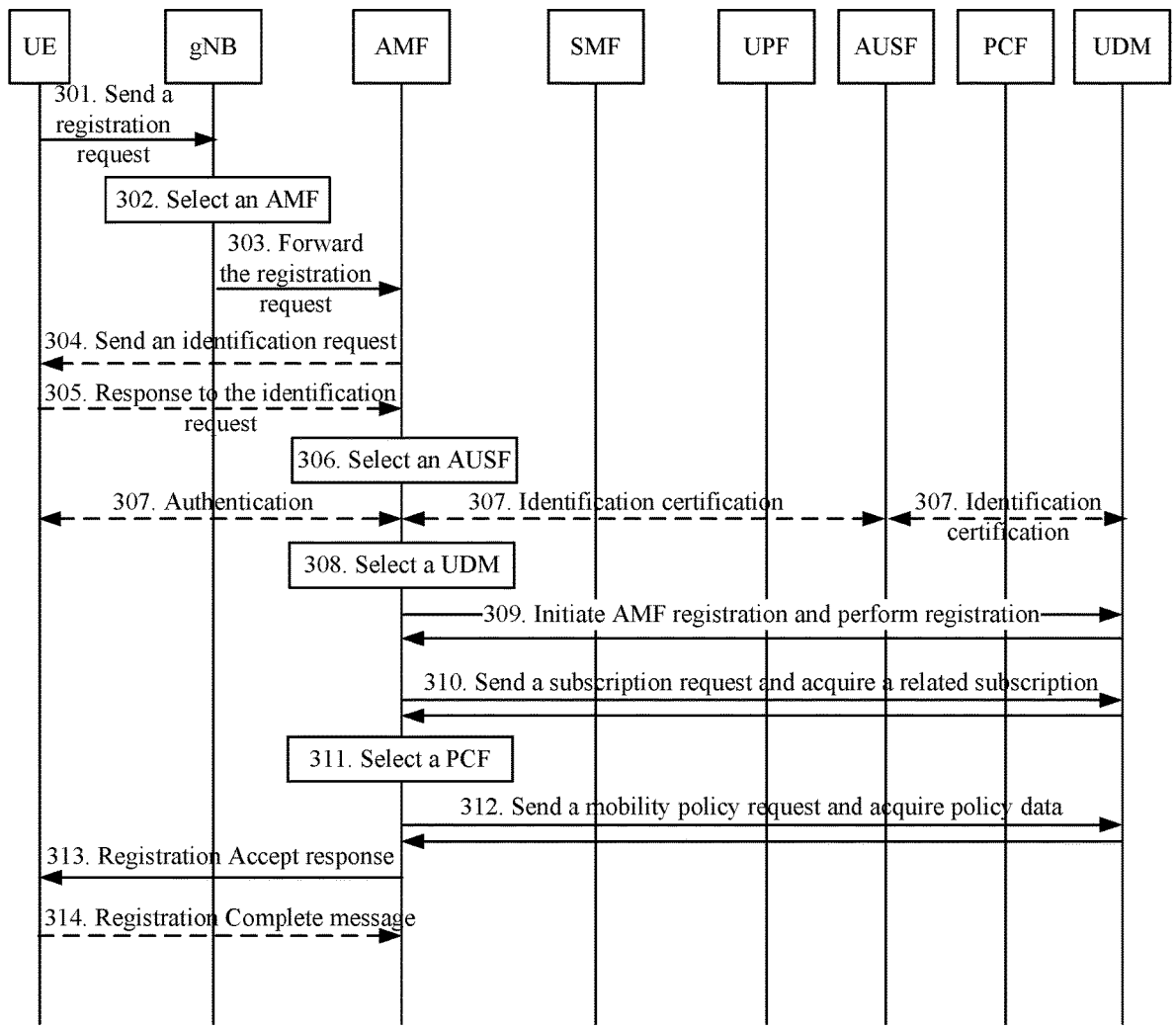
FIG. 3 is a flowchart illustrating that a UE registers with a 5G network in the related art.

FIG. 3 is a flowchart illustrating that the UE registers with the 5G network. The process includes steps 301 to 314.

In step 301, the UE sends a Registration Request to a gNB.

In step 302, the gNB selects an appropriate AMF based on conditions.

In step 303, the gNB forwards the registration request of the UE to the AMF.

In step 304, if the UE does not provide a Subscription Concealed Identifier (SUCI), the AMF sends an Identification Request to the UE.

In step 305, the UE returns the requested SUCI to the AMF in response to the identification request.

In step 306, the AMF selects an appropriate Authentication Server Function (AUSF) for the UE to perform an authentication operation.

In step 307, the AUSF initiates an identification certification and authentication process of the UE.

In step 308, the AMF selects an appropriate UDM for the UE.

In step 309, the AMF initiates AMF registration to the UDM, and the UDM receives the AMF registration and registers information about the AMF serving the UE.

In step 310, the AMF sends a subscription request to the UDM to acquire a subscription related to mobility management of the UE. The UDM receives the request from the AMF and sends related subscription data to the AMF.

In step 311, the AMF selects an appropriate PCF for the UE.

In step 312, the AMF sends a mobility policy request to the PCF, and the PCF receives the request from the AMF and returns mobility policy data (AM policy) to the AMF.

In step 313, the AMF returns a Registration Accept response (Registration Accept) to the UE.

In step 314, after receiving the Registration Accept response from the AMF, the UE sends a Registration Complete message (Registration Complete) to the AMF.

Figure 4:
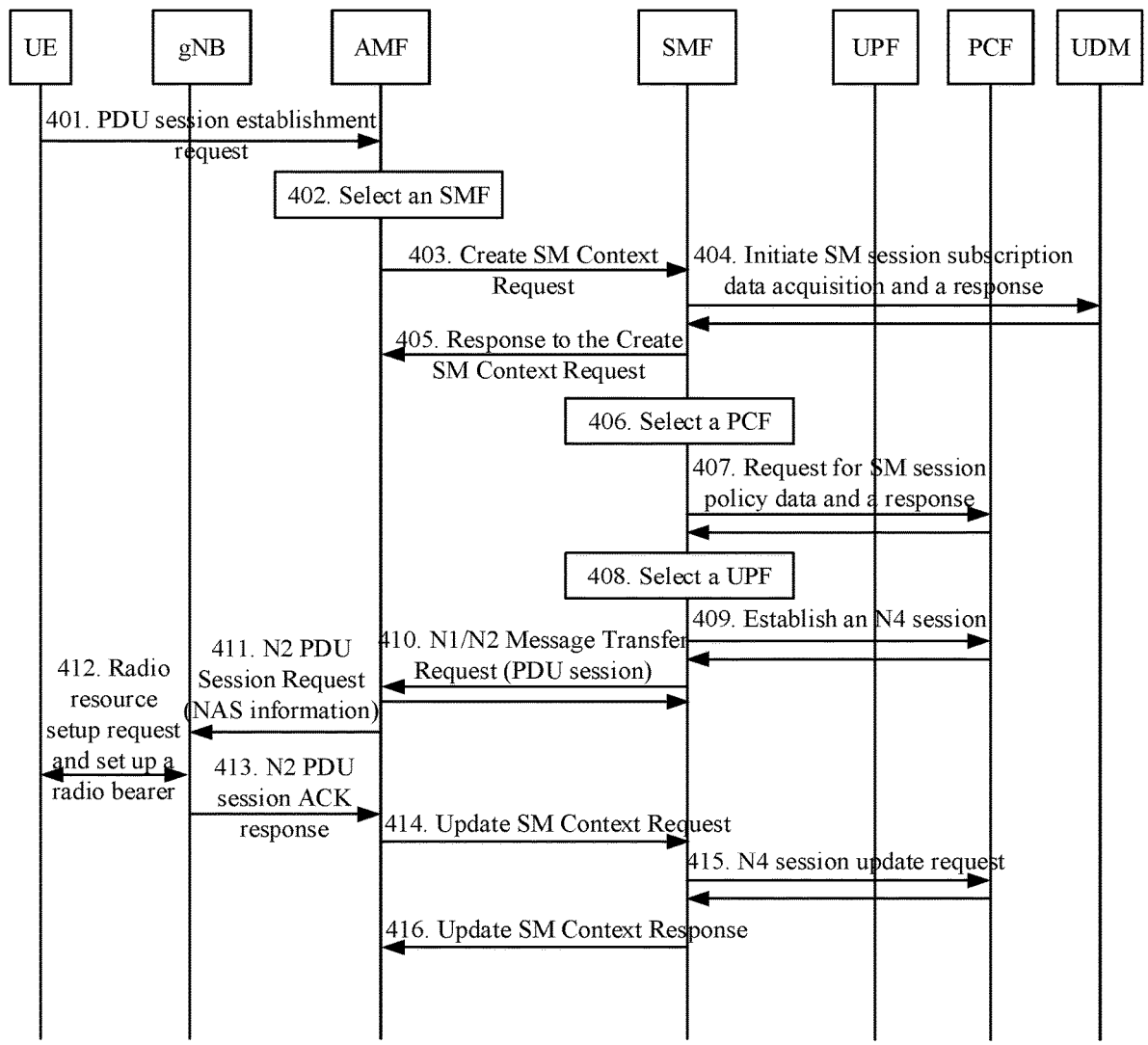
FIG. 4 is a flowchart illustrating that a UE initiates PDU session establishment after registering with a 5G network in the related art.

In addition, after the UE successfully registers with the 5G network, the UE may initiate the PDU session establishment. FIG. 4 is a flowchart illustrating that the UE initiates the PDU session establishment after registering with the 5G network. The process includes steps 401 to 416.

In step 401, the UE sends a PDU Session Establishment Request to the AMF.

In step 402, the AMF selects an appropriate SMF for the UE according to the PDU session establishment request from the UE, for example, a Data Network Name (DNN) requested by the UE.

In step 403, the AMF sends a Create SM Context Request (Create SMContext Request) to the SMF.

In step 404, the SMF initiates a session subscription data acquisition process to the UDM, and the UDM returns session subscription data of the UE to the SMF.

In step 405, the SMF returns a Create SM Context Response (Create SMContext Response) to the AMF.

In step 406, the SMF selects an appropriate PCF. If the AMF provides the PCF selected by the AMF in the preceding step, the SMF uses the PCF.

In step 407, the SMF sends a session policy request to the PCF, and the PCF receives the request from the SMF and returns session policy data (SM policy) to the SMF.

In step 408, the SMF selects an appropriate UPF based on information such as the DNN and a position of the UE.

In step 409, the SMF sends an N4 Session Establishment Request to the UPF, and the UPF establishes an N4 session in response to the request from the SMF and returns an N4 Session Establishment Response to the SMF.

In step 410, after the N4 session is successfully established, the SMF sends an N1/N2 Message Transfer Request (N1/N2Message Transfer) to the AMF, where the N1/N2 Message Transfer Request carries context information of the PDU session, such as a list of created QoS flows and an uplink F-TEID allocated by the UPF.

In step 411, the AMF sends an N2 PDU Session Request message to the gNB, where the message carries a NAS message to be sent by the AMF to the UE, and the non-access stratum (NAS) message includes partial context information of the PDU session to be sent to the UE.

In step 412, the gNB sends a radio resource setup (AN Resource Setup) request to the UE to set up an appropriate radio bearer for the UE according to information about the PDU session provided by the AMF.

In step 413, after a radio resource is set up, the gNB returns an N2 PDU session ACK message to the AMF, where the message carries an N3 interface resource allocated by the gNB, such as an F-TEID of the gNB.

In step 414, the AMF sends an Update SM Context Request (Update SMContext Request) to the SMF to update a remote F-TEID of the UPF on an N3 interface, that is, an F-TEID of the gNB on the UPF.

In step 415, the SMF sends an N4 Session Update Request to the UPF to update the F-TEID of the gNB on the N3 interface, and the UPF returns an N4 session update response to the SMF.

In step 416, the SMF returns an Update SM Context Response (Update SMContext Response) to the AMF.

Embodiments of the present application are further described below in detail through specific implementations in conjunction with the drawings. It is to be understood that the embodiments described herein are merely intended to explain the present application and not to limit the present application.

Embodiment One

Figure 5:
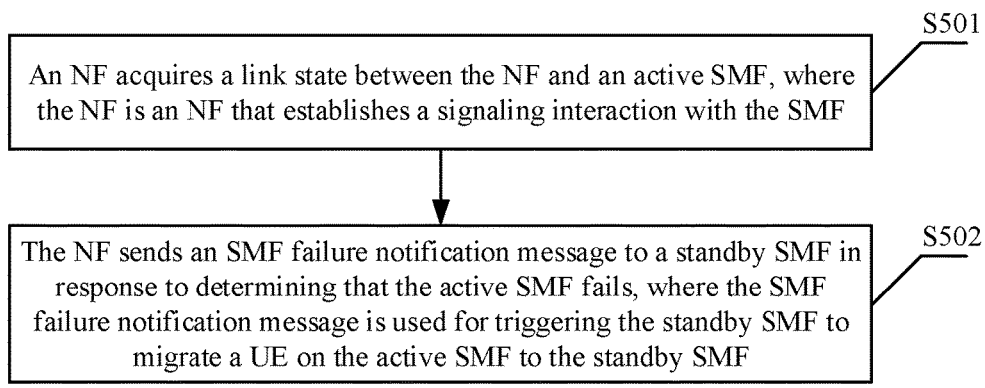
FIG. 5 is a flowchart of a UE migration method applied to an NF according to embodiment one of the present application.

To avoid the case where a failure of an SMF results in a failure of a PDU session and a transmission failure of uplink and downlink data of a UE in the related art, an embodiment of the present application provides a user equipment (UE) migration method. The UE migration method provided by this embodiment is applied to a Network Function (NF) and, as shown in FIG. 5, includes steps S501 and S502.

In step S501, the NF acquires a link state between the NF and an active SMF, where the NF is an NF that establishes a signaling interaction with the SMF.

Due to the requirement for interactions in a message flow, the NF and the SMF have the interactions in the message flow. The type of the NF includes a non-SMF NF such as an AMF, a UDM, a UPF and a PCF. The active SMF is a current SMF that has the signaling interaction with the NF. In this embodiment, the link state between the NF and the active SMF is detected and it is determined whether the active SMF fails by acquiring whether a link is broken.

In some implementations of this embodiment, the NF is the User Plane Function (UPF). In this case, the manner in which the UPF acquires the link state between the UPF and the active SMF includes, but is not limited to, two manners described below.

In manner one, the UPF acquires the link state between the UPF and the active SMF by detecting an N4 signaling sending state when sending an N4 signaling message to the active SMF. The N4 signaling message sent by the UPF to the SMF is, for example, a downlink data arrival notification. The UPF may perceive that the link is broken in response to a failure to send the signaling.

In manner two, the UPF acquires the link state between the UPF and the active SMF by detecting a heartbeat between the UPF and the active SMF after an N4 association with the active SMF is set up. A keep-alive mechanism such as the heartbeat exists between the UPF and the SMF for link detection, that is, a detection message is sent periodically, so as to determine the link state.

Figure 6:
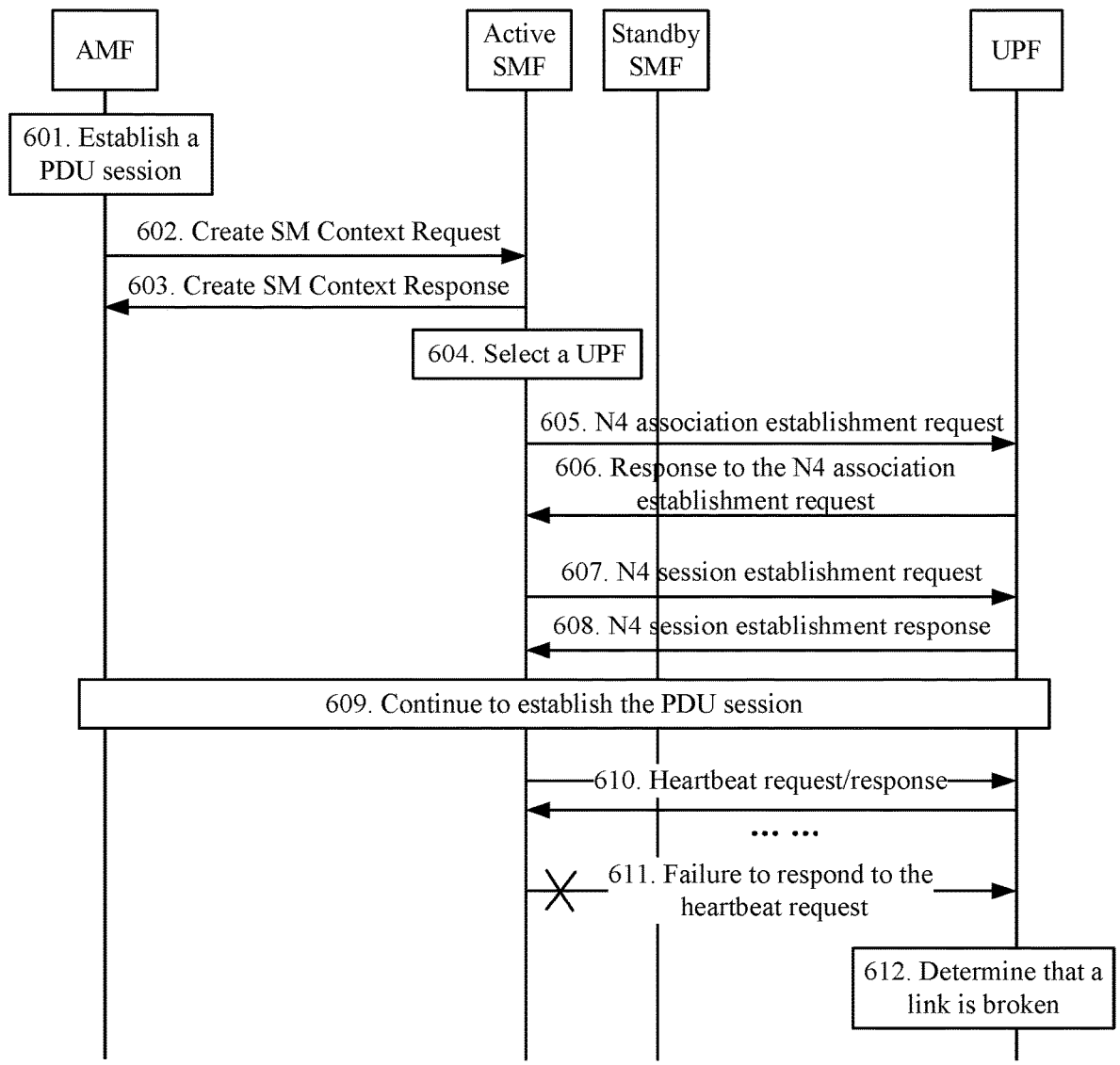
FIG. 6 is a flowchart illustrating that a UPF acquires a link state between the UPF and an active SMF through heartbeat according to embodiment one of the present application.

FIG. 6 is a flowchart illustrating that the UPF acquires the link state between the UPF and the active SMF through heartbeat according to this embodiment. The process includes steps 601 to 612.

In step 601, the AMF receives a PDU session establishment request.

The PDU session establishment request may be from a UE.

In step 602, the AMF selects an appropriate SMF as the active SMF for the UE and sends a Create SM Context Request to the active SMF.

In step 603, the active SMF returns a Create SM Context Response to the AMF.

In step 604, the active SMF selects an appropriate UPF.

In step 605, the active SMF sends an N4 association establishment request to the UPF to establish an association between the active SMF and the UPF.

In some implementations of this embodiment, the N4 association establishment request may include an SMF instance identifier (ID).

In step 606, the UPF receives the N4 association establishment request, sets up an N4 association with the active SMF, and returns an N4 association establishment response.

In step 607, the active SMF sends an N4 session establishment request to the UPF for establishing an N4 session for the UE.

In some implementations of this embodiment, the N4 session establishment request may include the SMF instance ID.

It should be noted that the active SMF may provide the UPF with its own SMF instance ID when setting up the N4 association with the UPF or when establishing the N4 session with the UPF, which is not uniquely limited here.

In addition, in some implementations of this embodiment, the N4 session establishment request may also include a connection set ID (CSID). The CSID may associate several N4 sessions of several UEs, which may be taken over by another SMF at the time of the failure.

In step 608, after establishing the N4 session, the UPF returns an N4 session establishment response to the active SMF.

In step 609, the active SMF continues to establish the PDU session.

The subsequent process for establishing the PDU session includes the following steps: the active SMF sends an N1/N2 Message Transfer Request to the AMF; the AMF sends an N2 PDU Session Request to a gNB; the gNB sends an AN resource setup request to the UE; after setting up a radio resource, the gNB returns an N2 PDU session ACK message to the AMF; the AMF sends an Update SM Context Request to the active SMF; the active SMF sends an N4 session update request to the UPF; and the active SMF returns an Update SM Context Response to the AMF.

In step 610, heartbeat is periodically initiated between the active SMF and the UPF after the N4 association is set up between the active SMF and the UPF.

The heartbeat between the active SMF and the UPF may be that the active SMF sends an N4 heartbeat request to the UPF and the UPF returns an N4 heartbeat response or that the UPF sends an N4 heartbeat request to the active SMF and the active SMF returns the N4 heartbeat response. In addition, it should be noted that the heartbeat between the active SMF and the UPF can be performed in any step after step 606 in which the N4 association is established and is not only limited to the step after step 609 in which the PDU session is established.

In step 611, when the active SMF fails, the active SMF cannot respond to the heartbeat request from the UPF.

In step 612, the UPF determines that the link with the active SMF is broken.

In response to the failure of the active SMF, the heartbeat between the UPF and the active SMF fails. After the heartbeat fails multiple times, the UPF may determine that the link therebetween is broken and determine that the active SMF fails.

Figure 7:
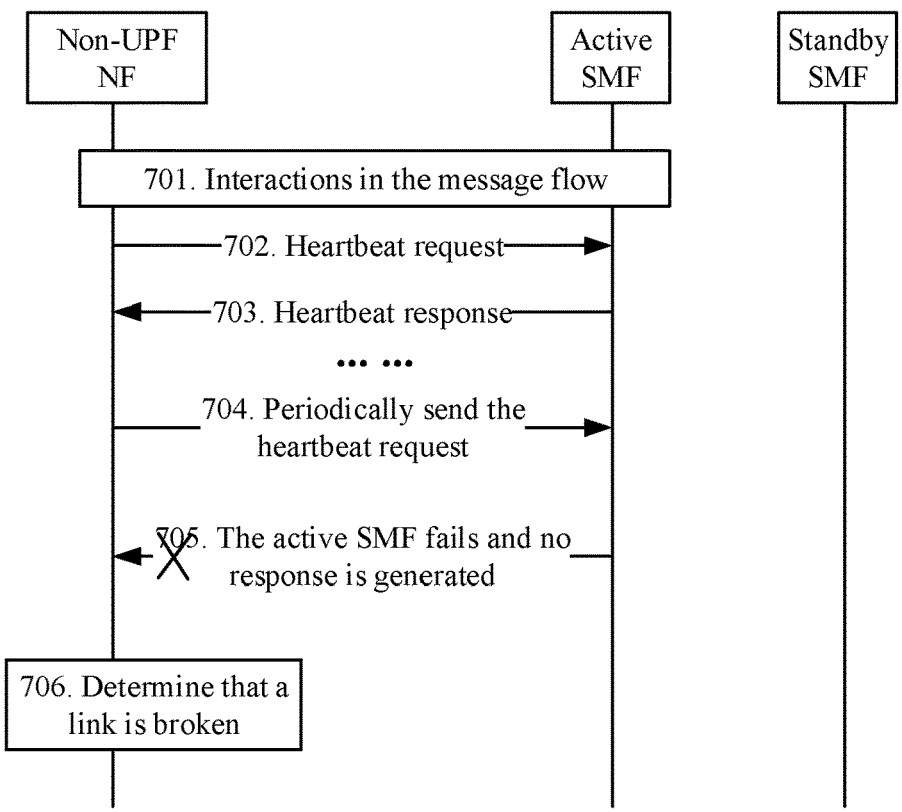
FIG. 7 is a flowchart illustrating that a non-UPF NF acquires a link state between the non-UPF NF and an active SMF through heartbeat according to embodiment one of the present application.

In addition, in other implementations of this embodiment, the NF is a non-UPF NF, that is, the NF is the AMF, the PCF, the UDM, or the like. The non-UPF NF acquires the link state between the non-UPF NF and the active SMF according to a situation of a heartbeat or a signaling interaction response between the non-UPF NF and the active SMF after the signaling interaction with the active SMF is established, thereby determining whether the active SMF fails. FIG. 7 is a flowchart illustrating that the non-UPF NF acquires the link state between the non-UPF NF and the active SMF through heartbeat according to this embodiment. The process includes steps 701 to 706.

In step 701, the non-UPF NF and the active SMF have the interactions in the message flow.

Due to the requirement for the interactions in the message flow, a non-UPF user of SMF services, such as the AMF, the PCF and the UDM, interact with SMF in the message flow.

In step 702, the non-UPF NF sends a heartbeat request message to the active SMF.

In step 703, the active SMF returns a heartbeat response message to a non-UPF NF consumer.

In step 704, when the non-UPF NF and the active SMF still interact in the flow, the non-UPF NF periodically sends a heartbeat request to the active SMF.

In step 705, when the active SMF fails, the active SMF cannot respond to the heartbeat request from the non-UPF NF.

In step 706, the link between the non-UPF NF and the active SMF is broken.

In some implementations, the non-UPF NF may determine that the link therebetween is broken and determine that the active SMF fails after multiple heartbeat requests are not responded to.

In step 502, the NF sends an SMF failure notification message to a standby SMF in response to determining that the active SMF fails, where the SMF failure notification message is used for triggering the standby SMF to migrate a UE on the active SMF to the standby SMF.

When the NF detects that the active SMF fails, the NF may send the SMF failure notification message to the standby SMF to trigger the standby SMF to replace the failed SMF and take over the UE on the failed SMF.

In an embodiment, before the SMF failure notification message is sent to the standby SMF, the method further includes that the NF acquires information about the standby SMF of the active SMF so that the NF sends the SMF failure notification message to the standby SMF according to the information about the standby SMF. The information about the standby SMF includes at least one of a set identifier of the standby SMF, an instance identifier of the standby SMF, a callback Uniform Resource Identifier (URI) for SMF restoration of the standby SMF, N4 interface information of the standby SMF, an SMF node identifier of the standby SMF or a correspondence between identifiers of standby SMFs and segment index IDs.

An SMF set ID is used for identifying a set of SMFs with the same characteristic or similar characteristics, where SMFs belonging to the same set are backups of each other. The SMF set ID may be set in an SMF configuration parameter of the active SMF, and then the NRF may query for another SMF with the same SMF set ID as the standby SMF according to the SMF set ID.

An SMF instance ID is used for uniquely identifying a specified SMF. SMF instance IDs of several standby SMFs may be specified in the information about the standby SMF in the SMF configuration parameter of the active SMF, and then the NRF may determine and select a certain SMF as the standby SMF according to the SMF instance IDs of standby SMFs.

The callback URI for SMF restoration of the standby SMF is used by the standby SMF to receive an SMF failure indication. The callback URI for SMF restoration may be configured in the SMF configuration parameter or in the information about the standby SMF in the SMF configuration parameter. The callback URI for SMF restoration configured in the SMF configuration parameter represents the callback URI for SMF restoration of the SMF itself. The callback URI for SMF restoration configured in the information about the standby SMF in the SMF configuration parameter represents that the standby SMF of the SMF is specified through the callback URI for SMF restoration in the information about the standby SMF.

The N4 interface information of the standby SMF is used for setting up the N4 association and may include an IP address for N4 association and a port for N4 association.

The correspondence between identifiers of standby SMFs and segment index IDs is used for indicating corresponding standby SMFs after UE context information on the active SMF is segmented and indexed. Considering that an error may be caused when a certain SMF suddenly needs to transfer a large volume of data to standby SMFs in case of a failure, the SMF may segment and index the UE context information stored by the SMF and determine an index ID, where the index ID is used for indicating that a part of information is transferred to one standby SMF and another part of information is transferred to another standby SMF. When the active SMF sends the N4 association establishment request to the UPF, the correspondence between identifiers of standby SMFs and segment index IDs may be carried to be delivered to the UPF. Subsequently, when PDU session context is created, the active SMF delivers a corresponding segment index ID to the UPF, and the UPF may determine from which standby MFs data is restored according to the correspondence at the time of restoration. In addition, an SMF identifier here may be one of the SMF instance ID or the SMF node identifier.

Figure 8:
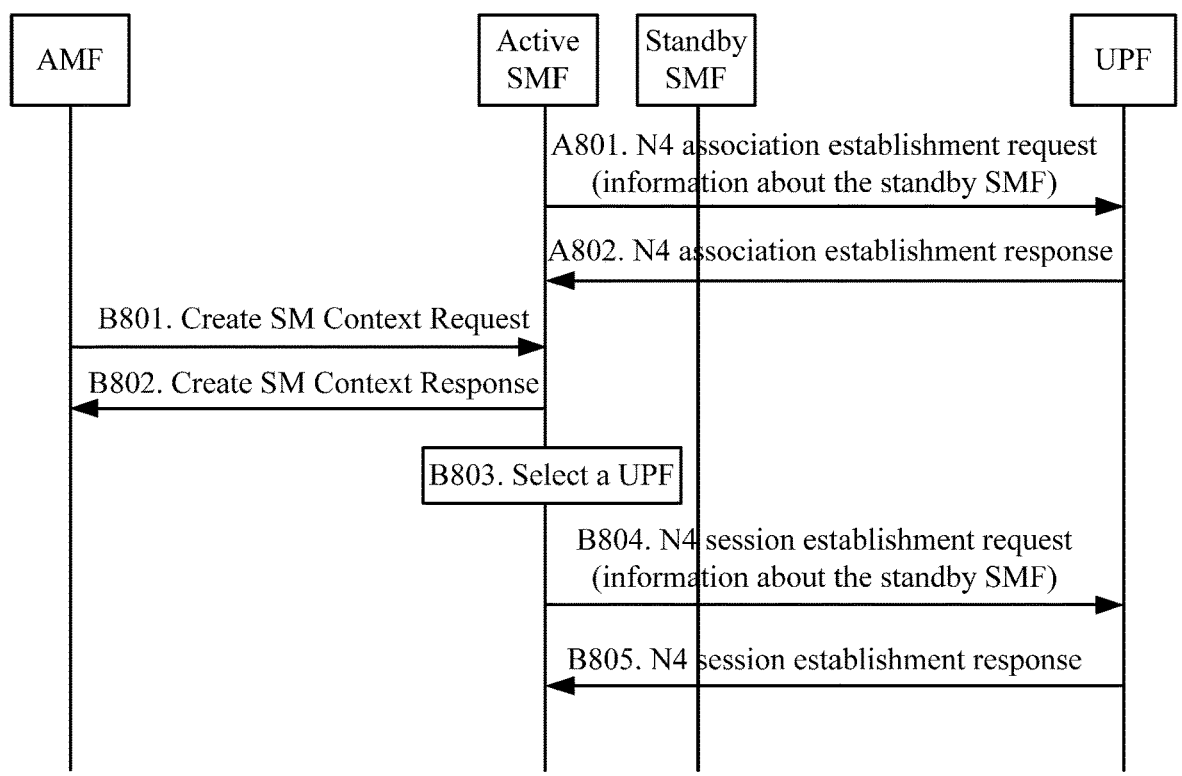
FIG. 8 is a flowchart illustrating that a UPF acquires information about a standby SMF according to embodiment one of the present application.

In some implementations of this embodiment, the UPF acquires the information about the standby SMF carried in the N4 association establishment request, an N4 association update request, the N4 session establishment request or the N4 session update request when receiving the N4 association establishment request, the N4 association update request, the N4 session establishment request or the N4 session update request sent by the active SMF. FIG. 8 is a flowchart illustrating that the UPF acquires the information about the standby SMF according to this embodiment. The above several acquisition manners are illustrated by flows A and B, respectively. The flows A and B include steps A801, A802, and B801 to B805.

The flow A illustrates that the information about the standby SMF is acquired when an N4 interface is established.

In step A801, the active SMF sends the N4 association establishment request to the UPF, where the N4 association establishment request carries the information about the standby SMF.

In an embodiment, in this step, the SMF may also carry its own identification information which may be one of an SMF node ID or an SMF instance ID or a combination thereof.

In step A802, the UPF receives the N4 association establishment request from the SMF and returns the N4 Association Establishment Response to the SMF according to the N4 association establishment request.

The UPF acquires the information about the standby SMF while receiving the N4 association establishment request from the SMF. It should be noted that the information about the standby SMF may be updated later. If the information about the standby SMF is updated, the information about the standby SMF may be delivered through the N4 association update request which carries an identifier or index information of the standby SMF in the same manner as the N4 association establishment request.

In addition, the flow B illustrates that the acquisition of the information about the standby SMF is triggered by establishing a session-level message.

In step B801, the AMF sends the Create SM Context Request to the active SMF.

In step B802, the active SMF receives the Create SM Context Request from the AMF and returns the Create SM Context Response to the AMF.

In step B803, the active SMF selects the appropriate UPF for the UE.

In step B804, the active SMF sends the N4 session establishment request to the UPF, where the N4 session establishment request carries the information about the standby SMF.

In step B805, the UPF receives the N4 session establishment request from the active SMF, establishes the N4 session according to the request, and returns the N4 session establishment response to the active SMF.

It should be understood that the information about the standby SMF may also be updated later. If the information about the standby SMF is updated, the information about the standby SMF may be delivered along with a subsequent PDU session establishment or update message, and the UPF also updates the information about the standby SMF upon receipt.

In other implementations of this embodiment, the non-SMF NF including the AMF, the UDM, the UPF and the PCF acquires from an NF Repository Function (NRF) the information about the standby SMF registered by the active SMF when the NRF receives an NF registration request from the active SMF. Firstly, the active SMF sends the NF registration request including the SMF configuration parameter to the NRF. It should be noted that the SMF further carries one of the SMF set ID or a list of standby SMFs or a combination thereof. Each SMF in the list of standby SMFs contains its SMF instance ID. Then, the NRF receives and processes the NF registration request from the SMF and returns an NF registration response to the SMF so that the active SMF registers the information about the standby SMF on the NRF.

Figure 9:
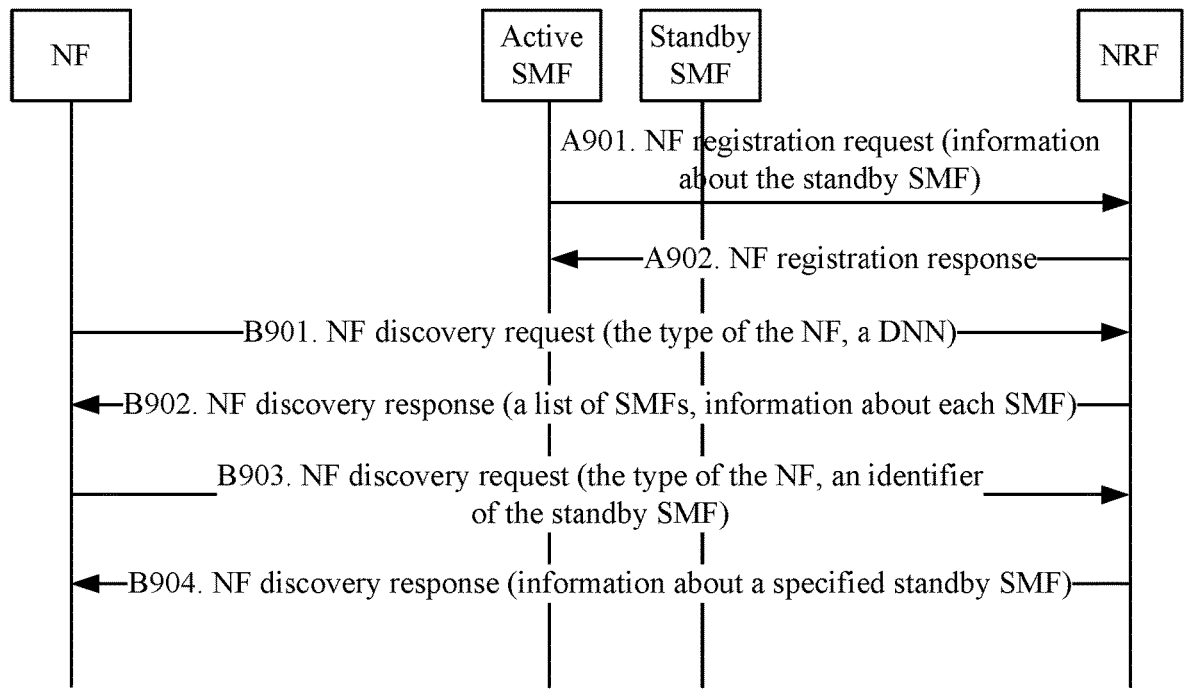
FIG. 9 is a flowchart illustrating that an NF acquires information about a standby SMF according to embodiment one of the present application.

FIG. 9 is a flowchart illustrating that the NF acquires the information about the standby SMF according to this embodiment. The process in which the information about the standby SMF is registered on the NRF and the process in which the NF acquires the information about the standby SMF are illustrated by flows A and B, respectively. The flows A and B include steps A901, A902, and B901 to B904.

In step A901, the active SMF sends the NF registration request to the NRF, where the NF registration request carries a configuration parameter of the standby SMF which includes the information about the standby SMF.

In an embodiment, in this step, the active SMF further carries one of the SMF set ID or the list of standby SMFs or the combination thereof. Each SMF in the list of standby SMFs contains its SMF instance ID.

In step A902, the NRF receives and processes the NF registration request from the SMF and returns an NF registration response to the SMF.

When the NF needs to acquire several standby SMFs according to the requirements of different flows, steps B901 and B902 are performed so that the list of standby SMFs for selection is acquired from the NRF. Alternatively, when the NF has obtained an identifier of a specific SMF (which may be the active SMF or the standby SMF), the NF needs to obtain the configuration parameter of the SMF from the NRF, and steps B903 and B904 are performed.

In step B901, the NF sends an NF discovery request to the NRF to specify the type of the NF to be the SMF and provide a DNN that needs to be supported by the SMF and other necessary information.

In an embodiment, in this step, the NF may also specify the SMF set ID and require the NRF to return the list of standby SMFs with the same SMF set ID.

In step B902, the NRF searches for appropriate standby SMFs according to the NF discovery request from the NF and returns an NF discovery response to the NF. The NF discovery response includes the list of standby SMFs and the configuration parameter of each SMF.

In step B903, the NF sends the NF discovery request to the NRF to specify the type of the NF to be the SMF and provide the identifier of the standby SMF.

In an embodiment, in this step, the SMF identifier may be one of the SMF instance ID or the SMF node ID.

In step B904, the NRF acquires a configuration parameter of the specified standby SMF according to the NF discovery request from the NF and returns the NF discovery response to the NF. The NF discovery response includes the configuration parameter of the requested SMF. Generally, the information about the standby SMF of the SMF is included in the configuration parameter of the SMF.

When one active SMF corresponds to multiple standby SMFs, the configuration parameter further includes the corresponding segment index ID.

After acquiring an instance ID of the active SMF or the SMF node ID, the NF may obtain an SMF configuration parameter of the active SMF from the NRF and obtain the information about the standby SMF from the SMF configuration parameter. If the information about the standby SMF includes only the instance ID of the standby SMF, the NF may further acquire other information about the standby SMF from the NRF, such as the callback URI for SMF restoration, the N4 interface information of the standby SMF, the node identifier of the standby SMF and an FQDN or an IP address that enables a query.

In some implementations of this embodiment, the SMF failure notification message includes at least one of an SMF instance identifier of the active SMF, an SMF node identifier of the active SMF, an SMF failure indication of the active SMF or a UE migration range indication.

In addition, the UE migration range indication includes, for example, any one of all UEs, UEs within a specified range or UEs within a random range.

All UEs indicate that the standby SMF migrates all UEs from the failed active SMF to the standby SMF. The UEs within the specified range indicate that the standby SMF migrates UEs within a particular range from the active SMF to the standby SMF. The UEs within the random range is not specified in a specific UE range but is all or part of UEs migrated by the standby SMF from the active SMF to the standby SMF according to a local policy or as determined by a UDSF.

According to the UE migration method provided by the embodiment of the present application, in some implementations, the NF acquires the link state between the NF and the active SMF, where the NF is the NF that establishes the signaling interaction with the SMF; when the NF determines that the active SMF fails, the NF sends the SMF failure notification message to the standby SMF, so as to trigger the standby SMF to migrate the UE on the active SMF to the standby SMF, thereby effectively avoiding the case where the failure of the SMF results in the failure of the PDU session and a failure to normally transmit the uplink and downlink data of the UE. Moreover, the present application further provides a method for restoring UEs on the failed SMF to the standby SMF in batches, which can effectively save the overall time for SMF restoration.

Embodiment Two

Figure 10:
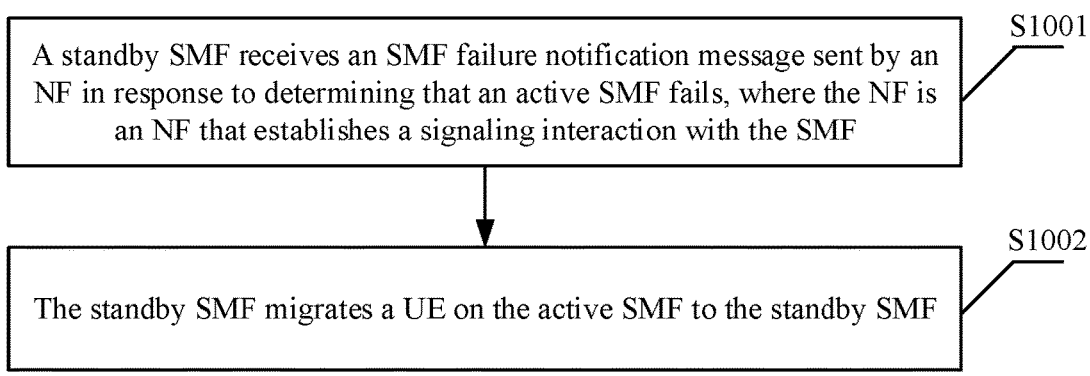
FIG. 10 is a flowchart of a UE migration method applied to a standby SMF according to embodiment two of the present application.

To avoid the case where a failure of an SMF results in a failure of a PDU session and a failure to normally transmit uplink and downlink data of a UE in the related art, an embodiment of the present application provides a UE migration method. The UE migration method provided by this embodiment is applied to a standby SMF and, as shown in FIG. 10, includes steps S1001 and S1002.

In step S1001, the standby SMF receives an SMF failure notification message sent by an NF in response to the NF determining that an active SMF fails, where the NF is an NF that establishes a signaling interaction with the SMF.

In the embodiment of the present application, the active SMF is a current SMF that has the signaling interaction with the NF. When the NF detects that the active SMF is a failed SMF, the NF sends the SMF failure notification message to the standby SMF to trigger the standby SMF to replace the failed SMF and take over a UE on the failed SMF. It should be understood that the type of the NF includes a non-SMF NF such as an AMF, a UDM, a UPF and a PCF.

In some embodiments of the present application, the SMF failure notification message includes failure indication information for indicating to the standby SMF that the active SMF fails. Alternatively, the SMF failure notification message is a Service message for the standby SMF to determine that the active SMF fails in response to finding UE context information indicated by the Service message.

By using the UPF as an example, after selecting one or more standby SMFs according to a system configuration or an operator policy, the UPF sends the failure indication information to the standby SMFs in a manner described below.

(a) If information about the standby SMF acquired by the UPF includes only an SMF instance ID of the standby SMF, the UPF acquires a configuration parameter of the SMF from an NRF using the SMF instance ID.

The SMF configuration parameter includes a callback address for receiving an SMF failure indication or information for establishing an N4 interface.

If the SMF configuration parameter includes the callback address for receiving the SMF failure indication, the UPF sends the failure indication information to the SMF by method (b).

If the SMF configuration parameter includes only the information for establishing the N4 interface, the UPF sends the failure indication information to the SMF by method (c).

(b) If the information about the standby SMF or the configuration parameter of the standby SMF acquired by the UPF includes the callback address for the standby SMF to receive the SMF failure indication, the UPF sends a notification message including the failure indication information to the callback address.

(c) If the information about the standby SMF or the configuration parameter of the standby SMF acquired by the UPF includes the information for establishing the N4 interface, the UPF establishes an N4 association with the standby SMF and sends an N4 interface notification message including the failure indication information to the standby SMF.

When more than one standby SMF is used, the UPF may transfer context to different standby SMFs according to different division principles, that is, the message may also include an index ID in the preceding embodiment. The more than one standby SMF may acquire data from a UDSF according to the index ID provided by the UPF. If the UPF does not provide the standby SMF with the index ID, the standby SMF may also acquire the context from the UDSF according to an index ID locally configured for the failed SMF.

After the SMF failure indication sent by the UPF, the standby SMF queries the UDSF for the context stored by the failed active SMF. The standby SMF provides the UDSF with identification information of the failed SMF. When there are multiple standby SMFs, the index ID may be provided, for example. The UDSF provides the standby SMF with context information of the failed active SMF. If the UDSF is not deployed, the standby SMF may also perform restoration according to backup information configured.

If the failure indication is triggered by a Service NF, another non-SMF NF queries the NRF to acquire information about a standby NRF and then sends a request to the standby NRF, where the request carries an identifier related to a terminal. The standby SMF has no information about the terminal locally, further queries local storage or the UDSF to acquire the context of the terminal, and accordingly determines that the active SMF fails and takes over a subsequent process of the terminal.

In some implementations of this embodiment, the NF may be the UPF.

In addition, when the NF is the UPF, the manner in which the standby SMF receives the SMF failure notification message sent by the UPF in response to determining that the active SMF fails may include, but is not limited to, two manners described below.

In manner one, the standby SMF receives the SMF failure notification message sent by the UPF through a callback URI for SMF restoration of the standby SMF in response to determining that the active SMF fails.

In manner two, the standby SMF receives the SMF failure notification message sent by the UPF through an N4 interface of the standby SMF in response to determining that the active SMF fails.

If the information about the standby SMF acquired by the UPF includes only the SMF instance ID of the standby SMF, the UPF acquires the configuration parameter of the SMF from the NRF using the SMF instance ID. The SMF configuration parameter includes the callback address for receiving the SMF failure indication or the information for establishing the N4 interface so that the UPF sends the SMF failure notification message to the callback address or the N4 interface.

It should be noted that the SMF failure notification message may include at least one of an SMF instance identifier of the active SMF, an SMF node identifier of the active SMF, the SMF failure indication of the active SMF or a UE migration range indication.

In step S1002, the standby SMF migrates the UE on the active SMF to the standby SMF.

In the embodiment of the present application, the manner in which the standby SMF migrates the UE on the active SMF to the standby SMF includes, but is not limited to, two manners described below.

In manner one, the standby SMF acquires context information of the UE on the active SMF from the Unstructured Data Storage Function (UDSF); and the standby SMF updates SMF information on the NF according to the context information and migrates the UE from the active SMF to the standby SMF, where the NF is the non-SMF NF that has the signaling interaction with the SMF. That is, if the UDSF exists in a network, the SMF dynamically stores data on the UDSF, and in case of the failure, the standby SMF acquires the context from the UDSF.

In manner two, the standby SMF acquires the context information of the UE on the active SMF from information about the active SMF backed up dynamically in the local storage; and the standby SMF updates the SMF information on the NF according to the context information and migrates the UE from the active SMF to the standby SMF, where the NF is the non-SMF NF that has the signaling interaction with the SMF. That is, if no UDSF exists in the network, the SMF dynamically backs up data in the standby SMF, and in case of the failure, the standby SMF directly uses the context in the local storage for restoration.

In some implementations of this embodiment, the standby SMF determines a UE to be migrated on the active SMF according to the UE migration range indication carried in the SMF failure notification message; and the standby SMF migrates the determined UE to the standby SMF. If a UE migration range is set to all UEs, the standby SMF migrates all UEs on the active SMF to the standby SMF. If the UE migration range is set to UEs within a specified range, the standby SMF migrates specified UEs on the active SMF to the standby SMF. If the UE migration range is set to an unspecified range, the standby SMF migrates randomly determined UEs to the standby SMF according to a local policy, where the randomly determined UEs may be all or part of the UEs.

It should be noted that when more than one standby SMF is used, the NF may transfer the context to different standby SMFs according to different division principles. The SMF failure notification message received by the standby SMF and sent by the NF carries a segment index ID in the preceding embodiment. The standby SMF may acquire the context information from the UDSF according to the index ID provided by the UPF. Of course, if the NF does not provide the segment index ID, the standby SMF may also acquire the context information from the UDSF according to the segment index ID locally configured for the failed active SMF.

In addition, in the embodiment of the present application, the manner in which the standby SMF migrates the UE on the active SMF further includes, but is not limited to, three manners described below.

In manner one, the standby SMF updates the SMF information on the NF according to the context information of the UE in units of single UE.

Figure 11:
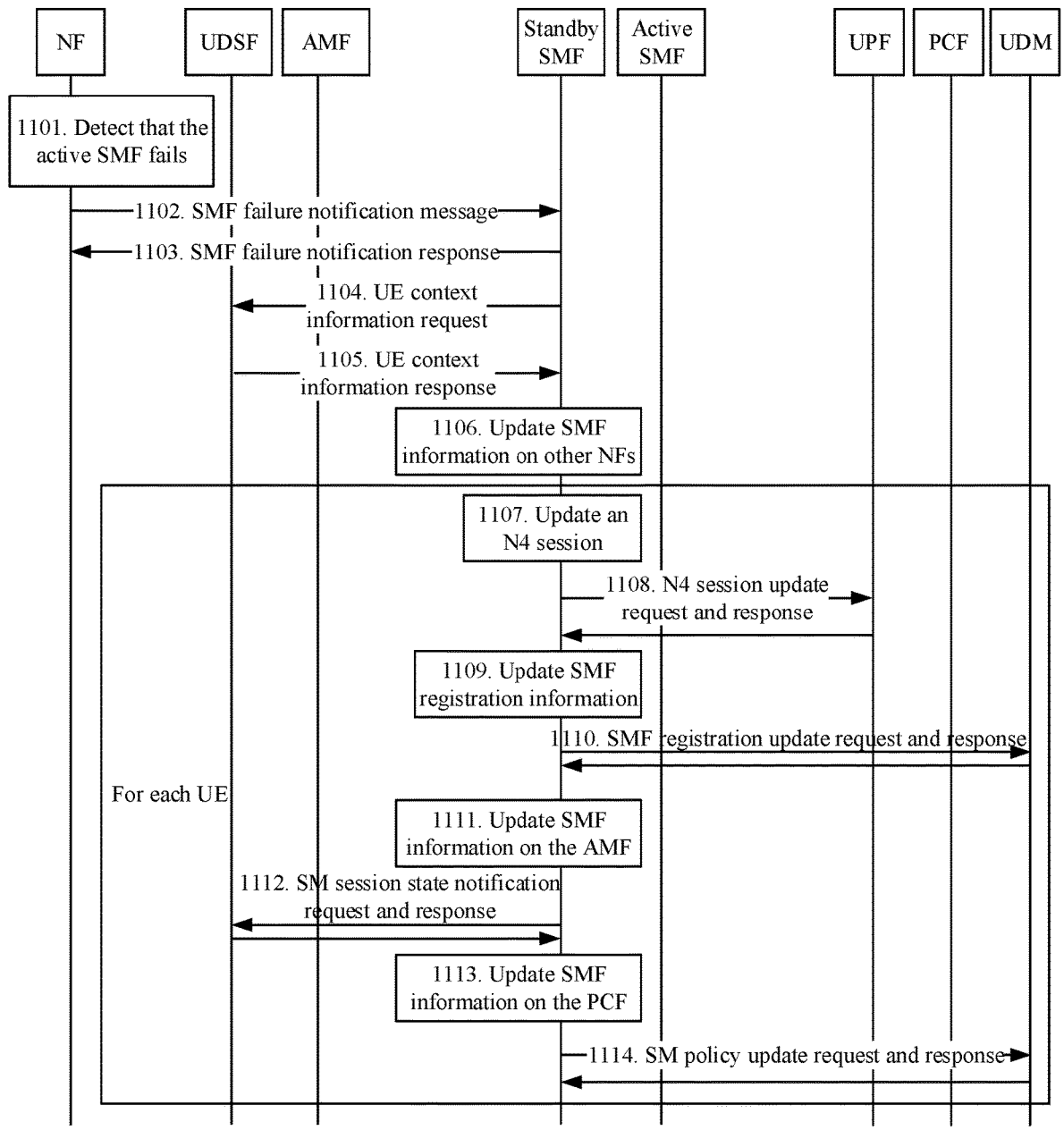
FIG. 11 is a flowchart illustrating that an NF triggers a standby SMF to migrate a UE after knowing that an active SMF fails according to embodiment two of the present application.

In some implementations of this embodiment, the step in which the standby SMF updates the SMF information on the NF according to the context information of the UE in units of single UE includes at least one of steps described below. The standby SMF sends an N4 session update request to the User Plane Function (UPF) according to the context information of the UE to update the SMF information on the UPF, where the N4 session update request includes an SMF replacement indication and the information about the active SMF. The standby SMF sends an SMF registration update request to the unified data management (UDM) function according to the context information of the UE to update the SMF information on the UDM, where the SMF registration update request includes an SMF replacement indication and the information about the active SMF. The standby SMF sends an SM session state update request to the AMF according to the context information of the UE to update the SMF information on the AMF, where the SM session state update request includes an SMF replacement indication and the information about the active SMF. The standby SMF sends an SM policy update request to the Policy Control Function (PCF) according to the context information of the UE to update the SMF information on the PCF, where the SM policy update request includes an SMF replacement indication and the information about the active SMF. FIG. 11 is a flowchart illustrating that the NF triggers the standby SMF to migrate the UE after knowing that the active SMF fails according to this embodiment. As shown in FIG. 11, the process includes steps 1101 to 1114.

In step 1101, when detecting that the active SMF fails, the NF notifies the standby SMF that the standby SMF takes over the UE on the failed SMF.

The NF may detect that the active SMF fails in the manner in embodiment one and then the NF acquired the information about the standby SMF from the SMF configuration parameter (SMF Profile).

In step 1102, the NF sends the SMF failure notification message to the standby SMF to trigger the standby SMF to replace the active SMF and take over all or part of the UEs on the active SMF.

In this step, the SMF failure notification message carries the SMF instance ID of the replaced SMF. In addition, in some implementations, the SMF replacement indication, the UE migration range indication and an NF replacement reason may also be carried. The UE migration range indication may be one of all UEs, UEs within a specified range or UEs within a random range. The NF replacement reason may be an SMF failure, for example.

In step 1103, the standby SMF returns an SMF failure notification response to the NF.

In step 1104, the standby SMF queries the UDSF for the context information of the UE on the failed active SMF.

The standby SMF queries the UDSF for the context information of the UE on the active SMF in a manner described below.

(a) If the UE migration range is set to all UEs, the standby SMF acquires context information of all UEs on the active SMF from the UDSF.

(b) If the UE migration range is set to the UEs within the specified range, the standby SMF provides the UDSF with the UE range and acquires context information of the UEs within the specified range and on the failed active SMF from the UDSF.

(c) If the UE migration range is set to the UEs within the random range, the standby SMF acquires context information of all or part of the UEs on the failed active SMF from the UDSF according to the local policy or a policy of the UDSF.

The UE context information acquired by the standby SMF from the UDSF includes one of PDU session context, N4 session context, UDM registration information, AMF information or PCF information or a combination thereof.

In step 1105, the UDSF returns a list of requested context information of the UEs on the failed active SMF to the standby SMF according to the request from the standby SMF.

The standby SMF acquires the UE context information of each UE, which includes the PDU session context, the N4 session context, the UDM registration information, the AMF information, PCF information or the like.

In step 1106, the standby SMF updates the SMF information on other NFs for each UE.

The standby SMF acquires the UE context information of each UE from the acquired list of context information of the UEs on the failed SMF and restores an N4 session between the SMF and the UPF (steps 1107 and 1108), updates the SMF registration information of the SMF on the UDM (steps 1109 and 1110), updates the information of the SMF on the AMF (steps 1111 and 1112), and updates the information of the SMF on the PCF (steps 1013 and 1014) according to the UE context information.

In step 1107, the standby SMF decides to update the N4 session of the UE on the UPF.

Before the SMF initiates the N4 session update request to the UPF, the standby SMF establishes the N4 association with the UPF.

In step 1108, the standby SMF sends the N4 session update request to the UPF to instruct the UPF to update the SMF information of the N4 session, and the UPF returns an N4 session update response to the standby SMF.

In this step, the standby SMF carries the following information when sending the N4 session update request: the SMF replacement indication and the information about the original SMF (old SMF info) which may include one of the SMF node ID or the SMF instance ID or a combination thereof. In addition, the information about the target SMF (new SMF info) may also be carried, and the information about the target SMF may include one of an SMF node ID or an SMF instance ID or a combination thereof.

In step 1109, the standby SMF decides to update the SMF registration information on the UDM.

In step 1110, the standby SMF sends an SMF registration update request to the UDM to instruct the UDM to update the SMF registration information, and the UDM returns an SMF registration update response to the standby SMF.

In this step, the standby SMF carries the following information when sending the SMF registration update request: a UE identifier (such as an SUPI), the SMF replacement indication and the information about the original SMF (old SMF info). In addition, the information about the target SMF (new SMF info) may also be carried.

In step 1111, the standby SMF decides to update the SMF information on the AMF.

In step 1112, the standby SMF sends an SM session state notification request to the AMF to instruct the AMF to update the SMF information, and the AMF returns an SM session state notification response to the standby SMF.

In this step, the standby SMF may also carry the following information when sending the SM session state notification request: the UE identifier (such as the SUPI), the SMF replacement indication and the information about the original SMF (old SMF info). In addition, the information about the target SMF (new SMF info) may also be carried.

In step 1113, the standby SMF decides to update the SMF information on the PCF.

In step 1114, the standby SMF sends an SM policy update request to the PCF to instruct the PCF to update the SMF information, and the PCF returns an SM policy update response to the standby SMF.

In this step, the standby SMF may also carry the following information when sending an SM session policy update request: the UE identifier (such as the SUPI), the SMF replacement indication and the information about the original SMF (old SMF info). In addition, the information about the target SMF (new SMF info) may also be carried.

In manner two, the standby SMF updates the SMF information on the NF according to the context information of the UE in units of single NF.

Figure 12:
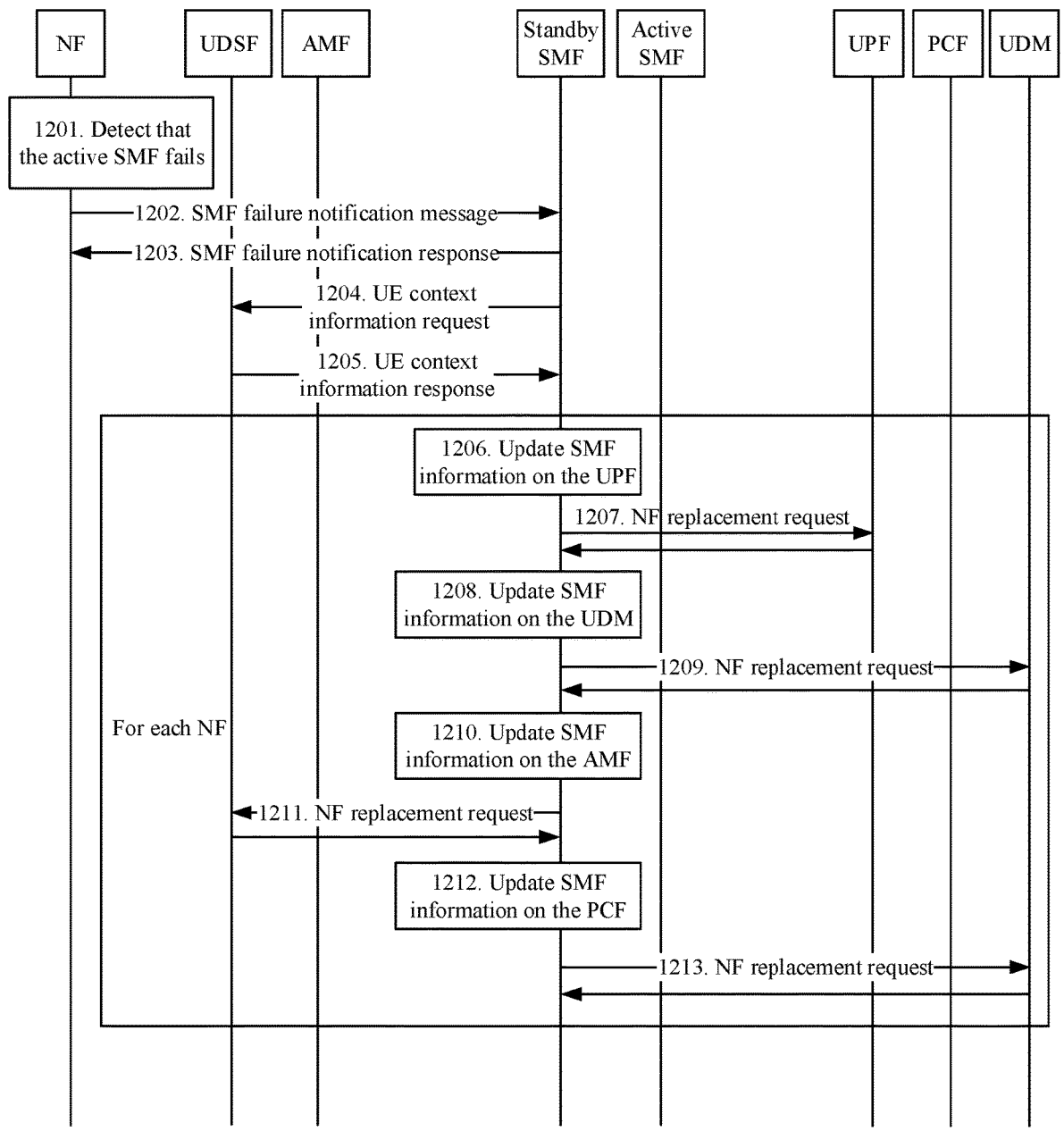
FIG. 12 is another flowchart illustrating that an NF triggers a standby SMF to migrate a UE after knowing that an active SMF fails according to embodiment two of the present application.

In some implementations of this embodiment, the step in which the standby SMF updates the SMF information on the NF according to the context information of the UE in units of single NF includes at least one of steps described below. The standby SMF sends an NF replacement request to each UPF according to the context information of the UE to update the SMF information on the UPF, where the NF replacement request includes the SMF replacement indication and the information about the active SMF. The standby SMF sends an NF replacement request to each UDM according to the context information of the UE to update the SMF information on the UDM, where the NF replacement request includes the SMF replacement indication and the information about the active SMF. The standby SMF sends an NF replacement request to each AMF according to the context information of the UE to update the SMF information on the AMF, where the NF replacement request includes the SMF replacement indication and the information about the active SMF. The standby SMF sends an NF replacement request to each PCF according to the context information of the UE to update the SMF information on the PCF, where the NF replacement request includes the SMF replacement indication and the information about the active SMF. FIG. 12 is another flowchart illustrating that the NF triggers the standby SMF to migrate the UE after knowing that the active SMF fails according to this embodiment. As shown in FIG. 12, the process includes steps 1201 to 1213.

Steps 1201 to 1205 are the same as steps 1101 to 1105 in the implementation corresponding to FIG. 11. The details are not repeated here.

In this embodiment, the standby SMF updates the SMF information on the other NFs for each NF. That is, from the acquired context information of the UEs on the failed SMF, the standby SMF lists the UPF, UDM, AMF, PCF and the like associated with the SMF and sends the NF replacement request to each of the UPF, UDM, AMF and PCF, separately.

In step 1206, the standby SMF decides to update the SMF information on each UPF.

In step 1207, the standby SMF sends the NF replacement request to the UPF to instruct the UPF to update the SMF information, and the UPF returns an NF replacement response to the standby SMF.

In step 1208, the standby SMF decides to update the SMF information on each UDM.

In step 1209, the standby SMF sends the NF replacement request to the UDM to instruct the UDM to update the SMF information, and the UDM returns the NF replacement response to the standby SMF.

In step 1210, the standby SMF decides to update the SMF information on each AMF.

In step 1211, the standby SMF sends the NF replacement request to the AMF to instruct the AMF to update the SMF information, and the AMF returns the NF replacement response to the standby SMF.

In step 1212, the standby SMF decides to update the SMF information on each PCF.

In step 1213, the standby SMF sends the NF replacement request to the PCF to instruct the PCF to update the SMF information, and the PCF returns the NF replacement response to the standby SMF.

In steps 1207, 1209, 1211 and 1213, the standby SMF may carry the following information when sending the NF replacement request: the SMF replacement indication and the information about the original SMF. In an embodiment, the standby SMF may also carry the information about the target SMF. It should be noted that the information about the original SMF and the information about the target SMF each include the corresponding SMF instance ID.

In manner three, the standby SMF updates a packet data unit (PDU) session according to the context information of the UE in units of single UE so that the SMF information on the NF is updated.

Figure 13:
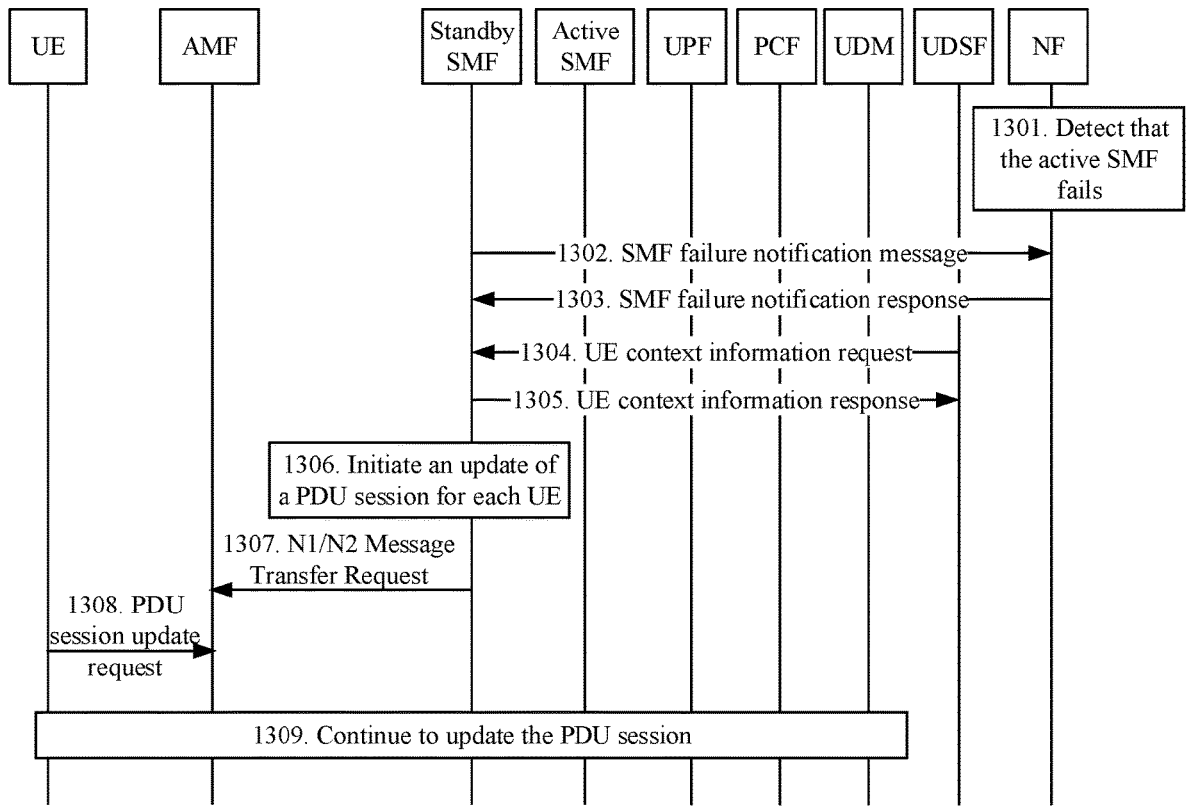
FIG. 13 is another flowchart illustrating that an NF triggers a standby SMF to migrate a UE after knowing that an active SMF fails according to embodiment two of the present application.

In some implementations of this embodiment, when the standby SMF uses single UE as the unit, the standby SMF sends an N1/N2 Message Transfer Request to the AMF according to the context information of the UE, where the N1/N2 Message Transfer Request includes a PDU session update request, so that the AMF sends the PDU session update request to the UE to update the PDU session. FIG. 13 is another flowchart illustrating that the NF triggers the standby SMF to migrate the UE after knowing that the active SMF fails according to this embodiment. As shown in FIG. 13, the process includes steps 1301 to 1309.

Steps 1301 to 1305 are the same as steps 1101 to 1105 in the implementation corresponding to FIG. 11. The details are not repeated here.

In step 1306, the standby SMF initiates a PDU session update process for each UE.

The standby SMF acquires the UE context information of each UE from the acquired list of context information of the UEs on the failed active SMF and initiates the PDU session update process using the UE context information.

In step 1307, the standby SMF sends the N1/N2 Message Transfer Request including the PDU session update request to the AMF.

In this step, the standby SMF may carry the SMF replacement indication and the information about the original SMF. In an embodiment, the standby SMF may also carry the information about the target SMF. It should be noted that the information about the original SMF and the information about the target SMF each include the corresponding SMF instance ID.

In step 1308, the AMF sends the PDU session update request to the UE.

In step 1309, the PDU session is continued to be updated so that session or information associations between the SMF and the UPF, the SMF and the UDM, the SMF and the AMF, and the SMF and the PCF are all updated, that is, the information about the original SMF (failed active SMF) on the UPF, UDM, AMF and PCF is updated to the information about the new SMF (standby SMF).

According to the UE migration method provided by the embodiment of the present application, in some implementations, the standby SMF receives the SMF failure notification message sent by the NF in response to the NF determining that the active SMF fails, where the NF establishes the signaling interaction with the SMF; and the standby SMF migrates the UE on the active SMF to the standby SMF as instructed by the SMF failure notification message, which can effectively avoid the case where the failure of the SMF results in the failure of the PDU session and the failure to normally transmit the uplink and downlink data of the UE. Moreover, the present application further provides a method for restoring UEs on the failed SMF to the standby SMF in batches, which can effectively save the overall time for SMF restoration.

Embodiment Three

Figure 14:
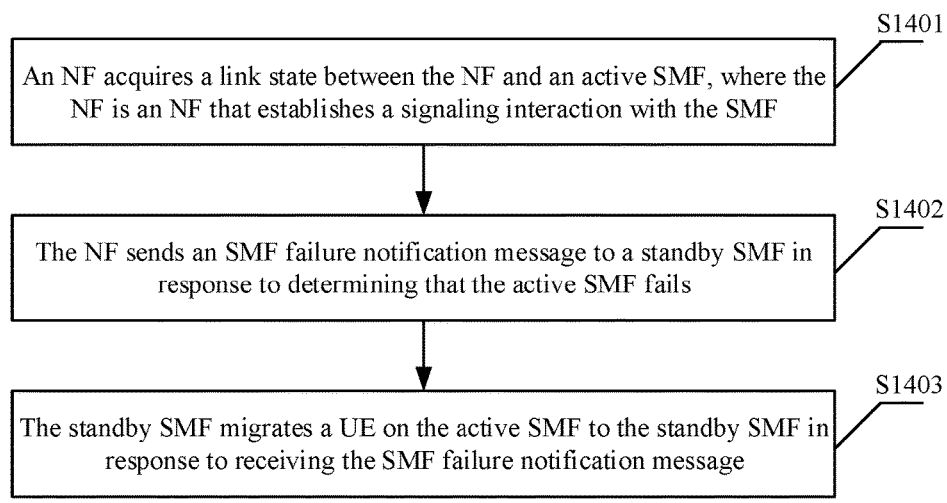
FIG. 14 is a flowchart of a UE migration method applied to a system according to embodiment three of the present application.

To avoid the case where a failure of an SMF results in a failure of a PDU session and a transmission failure of uplink and downlink data of a UE in the related art, an embodiment of the present application provides a UE migration method. The UE migration method provided by this embodiment is applied to a system including an NF and a standby SMF and, as shown in FIG. 14, includes steps 1401 to 1403.

In step 1401, the NF acquires a link state between the NF and an active SMF, where the NF is an NF that establishes a signaling interaction with the SMF.

The type of the NF includes a non-SMF NF such as an AMF, a UDM, a UPF and a PCF. The active SMF is a current SMF that has the signaling interaction with the NF. In this embodiment, the link state between the NF and the active SMF is detected and it is determined whether the active SMF fails by acquiring whether a link is broken.

In some implementations of this embodiment, the NF is the User Plane Function (UPF). In this case, the manner in which the UPF acquires the link state between the UPF and the active AMF includes, but is not limited to, two manners described below.

In manner one, the UPF acquires the link state between the UPF and the active SMF by detecting an N4 signaling sending state in response to sending an N4 signaling message to the active SMF. The N4 signaling message sent by the UPF to the SMF is, for example, a downlink data arrival notification. The UE may perceive that the link is broken in response to a failure to send the signaling.

In manner two, the UPF acquires the link state between the UPF and the active SMF by detecting a heartbeat between the UPF and the active SMF after an N4 association with the active SMF is established. A keep-alive mechanism such as the heartbeat exists between the UPF and the SMF for link detection, that is, a detection message is sent periodically, so as to determine the link state.

In addition, in other implementations of this embodiment, the NF is a non-UPF NF, that is, the NF is the AMF, the PCF, the UDM or the like. The non-UPF NF acquires the link state between the non-UPF NF and the active SMF according to heartbeat or a signaling interaction response situation between the non-UPF NF and the active SMF after the signaling interaction with the active SMF is established, thereby determining whether the active SMF fails.

In step 1402, the NF sends an SMF failure notification message to the standby SMF in response to determining that the active SMF fails.

When the NF detects that the active SMF fails, the NF may send the SMF failure notification message to the standby SMF to trigger the standby SMF to replace the failed SMF and take over a UE on the failed SMF. It should be noted that when the NF is the UPF, in an implementation, the UPF sends the SMF failure notification message to the standby SMF through a callback URI for SMF restoration of the standby SMF in response to determining that the active SMF fails. In another implementation, the UPF may also send the SMF failure notification message to the standby SMF through N4 interface information of the standby SMF in response to determining that the active SMF fails.

In addition, the step of sending the SMF failure notification message to the standby SMF includes that the NF acquires information about the standby SMF of the active SMF and that the NF sends the SMF failure notification message to the standby SMF according to the information about the standby SMF. The information about the standby SMF includes at least one of a set identifier of the standby SMF, an instance identifier of the standby SMF, the callback URI for SMF restoration of the standby SMF, the N4 interface information of the standby SMF, an SMF node identifier of the standby SMF or a correspondence between identifiers of standby SMFs and segment index IDs.

It should be noted that the correspondence between identifiers of standby SMFs and segment index IDs is used for indicating corresponding standby SMFs after UE context information on the active SMF is segmented and indexed. Considering that an error may be caused when a certain SMF suddenly needs to transfer a large volume of data to standby SMFs in case of a failure, the SMF may segment and index the UE context information stored by the SMF and determine an index ID, where the index ID is used for indicating that a part of information is transferred to one standby SMF and another part of information is transferred to another standby SMF. When the active SMF sends an N4 association establishment request to the UPF, the correspondence between identifiers of standby SMFs and segment index IDs may be carried to be delivered to the UPF. Subsequently, when PDU session context is created, the active SMF delivers a corresponding segment index ID to the UPF, and the UPF may determine on which standby MFs data is restored according to the correspondence at the time of restoration. In addition, an SMF identifier here may be one of the SMF instance ID or the SMF node identifier.

In some implementations of this embodiment, the UPF acquires the information about the standby SMF carried in the N4 association establishment request, an N4 association update request, an N4 session establishment request or an N4 session update request when receiving the N4 association establishment request, the N4 association update request, the N4 session establishment request or the N4 session update request sent by the active SMF.

In other implementations of this embodiment, the non-SMF NF including the AMF, the UDM, the UPF and the PCF acquires from an NF Repository Function (NRF) the information about the standby SMF registered by the active SMF when the NRF receives an NF registration request from the active SMF.

In some implementations of this embodiment, the SMF failure notification message includes at least one of an SMF instance identifier of the active SMF, an SMF node identifier of the active SMF, an SMF failure indication of the active SMF or a UE migration range indication.

In addition, the UE migration range indication includes, for example, any one of all UEs, UEs within a specified range or UEs within a random range.

All UEs indicate that the standby SMF migrates all UEs from the failed active SMF to the standby SMF. The UEs within the specified range indicate that the standby SMF migrates UEs within a particular range from the active SMF to the standby SMF. The UEs within the random range is not specified in a specific UE range, but is all or part of UEs migrated by the standby SMF from the active SMF to the standby SMF according to a local policy or as determined by a UDSF.

In step 1403, the standby SMF migrates the UE on the active SMF to the standby SMF in response to receiving the SMF failure notification message.

In the embodiment of the present application, the manner in which the standby SMF migrates the UE on the active SMF to the standby SMF includes, but is not limited to, two manners described below.

In manner one, the standby SMF acquires context information of the UE on the active SMF from the Unstructured Data Storage Function (UDSF); and the standby SMF updates SMF information on the NF according to the context information and migrates the UE from the active SMF to the standby SMF, where the NF is the non-SMF NF that has the signaling interaction with the SMF.

In manner two, the standby SMF acquires the context information of the UE on the active SMF from information about the active SMF backed up dynamically in local storage; and the standby SMF updates the SMF information on the NF according to the context information and migrates the UE from the active SMF to the standby SMF, where the NF is the non-SMF NF that has the signaling interaction with the SMF.

In addition, in the embodiment of the present application, the manner in which the standby SMF migrates the UE on the active SMF further includes, but is not limited to, three manners described below.

In manner one, the standby SMF updates the SMF information on the NF according to the context information of the UE in units of single UE.

In some implementations of this embodiment, the step in which the standby SMF updates the SMF information on the NF according to the context information of the UE in units of single UE includes at least one of steps described below. The standby SMF sends the N4 session update request to the User Plane Function (UPF) according to the context information of the UE to update the SMF information on the UPF, where the N4 session update request includes an SMF replacement indication and the information about the active SMF. The standby SMF sends an SMF registration update request to the unified data management (UDM) function according to the context information of the UE to update the SMF information on the UDM, where the SMF registration update request includes an SMF replacement indication and the information about the active SMF. The standby SMF sends an SM session state update request to the AMF according to the context information of the UE to update the SMF information on the AMF, where the SM session state update request includes an SMF replacement indication and the information about the active SMF. The standby SMF sends an SM policy update request to the Policy Control Function (PCF) according to the context information of the UE to update the SMF information on the PCF, where the SM policy update request includes an SMF replacement indication and the information about the active SMF.

In manner two, the standby SMF updates the SMF information on the NF according to the context information of the UE in units of single NF.

In some implementations of this embodiment, the step in which the standby SMF updates the SMF information on the NF according to the context information of the UE in units of single NF includes at least one of steps described below. The standby SMF sends an NF replacement request to each UPF according to the context information of the UE to update the SMF information on the UPF, where the NF replacement request includes the SMF replacement indication and the information about the active SMF. The standby SMF sends an NF replacement request to each UDM according to the context information of the UE to update the SMF information on the UDM, where the NF replacement request includes the SMF replacement indication and the information about the active SMF. The standby SMF sends an NF replacement request to each AMF according to the context information of the UE to update the SMF information on the AMF, where the NF replacement request includes the SMF replacement indication and the information about the active SMF. The standby SMF sends an NF replacement request to each PCF according to the context information of the UE to update the SMF information on the PCF, where the NF replacement request includes the SMF replacement indication and the information about the active SMF.

In manner three, the standby SMF updates a packet data unit (PDU) session according to the context information of the UE in units of single UE so that the SMF information on the NF is updated.

In some implementations of this embodiment, when the standby SMF uses single UE as the unit, the standby SMF sends an N1/N2 Message Transfer Request to the AMF according to the context information of the UE, where the N1/N2 Message Transfer Request includes a PDU session update request, so that the AMF sends the PDU session update request to the UE to update the PDU session.

According to the UE migration method provided by the embodiment of the present application, in some implementations, the NF that establishes the signaling interaction with the SMF acquires the link state between the NF and the SMF, the NF sends the SMF failure notification message to the standby SMF in response to determining that the active SMF fails, and the standby SMF migrates the UE on the active SMF to the standby SMF according to the received SMF failure notification message, which can effectively avoid the case where the failure of the SMF results in the failure of the PDU session and the failure to normally transmit the uplink and downlink data of the UE. Moreover, the present application further provides a method for restoring UEs on the failed SMF to the standby SMF in batches, which can effectively save the overall time for SMF restoration.

Embodiment Four

Figure 15:
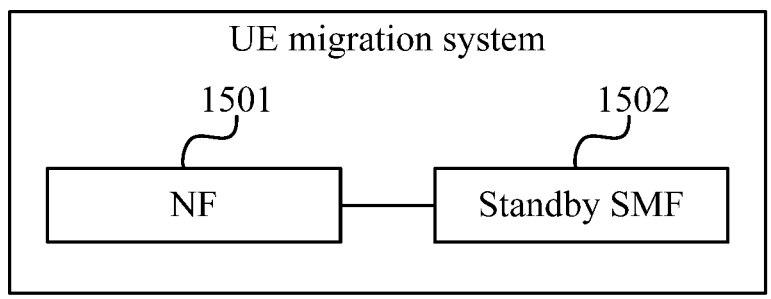
FIG. 15 is a structure diagram of a UE migration system according to embodiment four of the present application.

FIG. 15 is a structure diagram of a user equipment (UE) migration system according to this embodiment. The UE migration system includes an NF 1501 and a standby SMF 1502. The NF 1501 is an NF that has a signaling interaction with an SMF and configured to send an SMF failure notification message to the standby SMF 1502 in response to determining that an active SMF fails, where the SMF failure notification message is used for triggering the standby SMF 1502 to migrate a UE on the active SMF to the standby SMF. The standby SMF 1502 is configured to receive the SMF failure notification message sent by the NF 1501 in response to determining that the active SMF fails and migrate the UE on the active SMF to the standby SMF.

Figure 16:
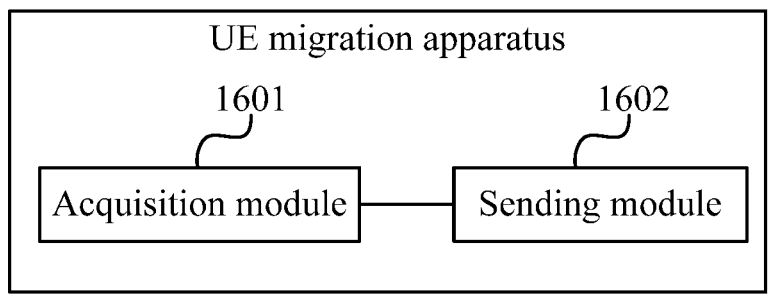
FIG. 16 is a structure diagram of a UE migration apparatus applied to an NF according to embodiment four of the present application.

FIG. 16 is a structure diagram of a user equipment (UE) migration apparatus which is applied to an NF that has a signaling interaction with an SMF according to an embodiment of the present application. As shown in FIG. 16, the UE migration apparatus includes an acquisition module 1601 and a sending module 1602. The acquisition module 1601 is configured to acquire a link state between the NF and an active SMF.

The sending module 1602 is configured to send an SMF failure notification message to a standby SMF in response to determining that the active SMF fails, where the SMF failure notification message is used for triggering the standby SMF to migrate a UE on the active SMF to the standby SMF.

In the embodiment of the present application, the type of the NF includes a non-SMF NF such as an AMF, a UDM, a UPF and a PCF. The active SMF is a current SMF that has the signaling interaction with the NF. In this embodiment, the acquisition module 1601 detects the link state between the NF and the active SMF and determines whether the active SMF fails by acquiring whether a link is broken.

In some implementations of this embodiment, the NF is the User Plane Function (UPF). In this case, the manner in which the acquisition module 1601 acquires the link state between the UPF and the active AMF includes, but is not limited to, two manners described below.

In manner one, the acquisition module 1601 acquires the link state between the UPF and the active SMF by detecting an N4 signaling sending state in response to the UPF sending an N4 signaling message to the active SMF. The N4 signaling message sent by the UPF to the SMF is, for example, a downlink data arrival notification. The acquisition module 1601 may perceive that the link is broken in response to a failure to send the signaling.

In manner two, the acquisition module 1601 acquires the link state between the UPF and the active SMF according to heartbeat between the UPF and the active SMF after an N4 association with the active SMF is established. A keep-alive mechanism such as the heartbeat exists between the UPF and the SMF for link detection, that is, a detection message is sent periodically, so as to determine the link state.

In addition, in other implementations of this embodiment, the NF is a non-UPF NF, that is, the NF is the AMF, the PCF, the UDM or the like. The acquisition module 1601 acquires the link state between the non-UPF NF and the active SMF according to heartbeat or a signaling interaction response situation between the non-UPF NF and the active SMF after the non-UPF NF establishes the signaling interaction with the active SMF, thereby determining whether the active SMF fails.

When it is detected that the active SMF fails, the sending module 1602 may send the SMF failure notification message to the standby SMF to trigger the standby SMF to replace the failed SMF and take over the UE on the failed SMF. It should be noted that when the NF is the UPF, in an implementation, the sending module 1602 sends the SMF failure notification message to the standby SMF through a callback URI for SMF restoration of the standby SMF in response to determining that the active SMF fails. In another implementation, the sending module 1602 may also send the SMF failure notification message to the standby SMF through N4 interface information of the standby SMF in response to determining that the active SMF fails.

In addition, the sending module 1602 is further configured to acquire information about the standby SMF of the active SMF and send the SMF failure notification message to the standby SMF according to the information about the standby SMF. The information about the standby SMF includes at least one of a set identifier of the standby SMF, an instance identifier of the standby SMF, the callback URI for SMF restoration of the standby SMF, the N4 interface information of the standby SMF, an SMF node identifier of the standby SMF or a correspondence between identifiers of standby SMFs and segment index IDs.

It should be noted that the correspondence between identifiers of standby SMFs and segment index IDs is used for indicating corresponding standby SMFs after UE context information on the active SMF is segmented and indexed. Considering that an error may be caused when a certain SMF suddenly needs to transfer a large volume of data to standby SMFs in case of a failure, the SMF may segment and index the UE context information stored by the SMF and determine an index ID, where the index ID is used for indicating that a part of information is transferred to one standby SMF and another part of information is transferred to another standby SMF. When the active SMF sends an N4 association establishment request to the UPF, the correspondence between identifiers of standby SMFs and segment index IDs may be carried to be delivered to the UPF. Subsequently, when PDU session context is created, the active SMF delivers a corresponding segment index ID to the UPF, and the UPF may determine on which standby MFs data is restored according to the correspondence at the time of restoration. In addition, an SMF identifier here may be one of the SMF instance ID or the SMF node identifier.

If the NF is the UPF, in some implementations of this embodiment, the sending module 1602 acquires the information about the standby SMF carried in a request message in response to receiving the N4 association establishment request, an N4 association update request, an N4 session establishment request or an N4 session update request and send the SMF failure notification message to the standby SMF according to the information about the standby SMF.

In other implementations of this embodiment, the sending module 1602 may also acquire from an NF Repository Function (NRF) the information about the standby SMF registered by the active SMF when the NRF receives an NF registration request from the active SMF and send the SMF failure notification message to the standby SMF according to the information about the standby SMF.

In some implementations of this embodiment, the SMF failure notification message includes at least one of an SMF instance identifier of the active SMF, an SMF node identifier of the active SMF, an SMF failure indication of the active SMF or a UE migration range indication.

In addition, the UE migration range indication includes, for example, any one of all UEs, UEs within a specified range or UEs within a random range.

Figure 17:
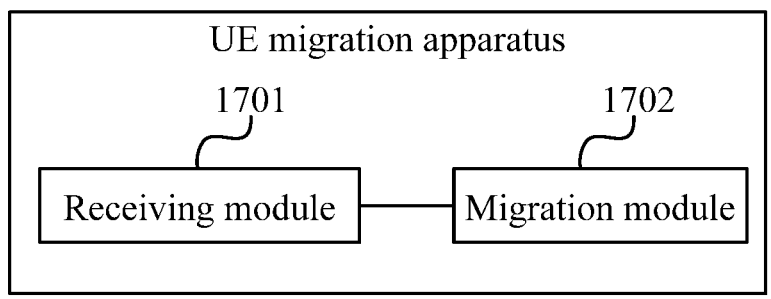
FIG. 17 is a structure diagram of a UE migration apparatus applied to a standby SMF according to embodiment four of the present application.

FIG. 17 is a structure diagram of a user equipment (UE) migration apparatus which is applied to a standby SMF according to an embodiment of the present application. As shown in FIG. 17, the UE migration apparatus includes a receiving module 1701 and a migration module 1702.

The receiving module 1701 is configured to receive an SMF failure notification message sent by an NF in response to determining that an active SMF fails, where the NF is an NF that establishes a signaling interaction with the SMF.

The migration module 1702 is configured to migrate a UE on the active SMF to the standby SMF.

In the embodiment of the present application, the active SMF is a current SMF that has the signaling interaction with the NF. When the NF detects that the active SMF is a failed SMF, the NF sends the SMF failure notification message to the standby SMF to instruct the standby SMF to replace the failed SMF and take over the UE on the failed SMF.

In the embodiment of the present application, the manner in which the migration module 1702 migrates the UE on the active SMF to the standby SMF includes, but is not limited to, two manners described below.

In manner one, the migration module 1702 acquires context information of the UE on the active SMF from an Unstructured Data Storage Function (UDSF), updates SMF information on the NF according to the context information, and migrates the UE from the active SMF to the standby SMF. That is, if the UDSF exists in a network, the SMF dynamically stores data on the UDSF and in case of the failure, the migration module 1702 acquires context from the UDSF.

In manner two, the migration module 1702 acquires the context information of the UE on the active SMF from information about the active SMF backed up dynamically in local storage, updates the SMF information on the NF according to the context information, and migrates the UE from the active SMF to the standby SMF. That is, if no UDSF exists in the network, the SMF dynamically backs up data in the standby SMF, and in case of the failure, the migration module 1702 directly uses the context in the local storage of the standby SMF for restoration.

In some implementations of this embodiment, the migration module 1702 determines the UE on the active SMF according to a UE migration range indication in the SMF failure notification message; and the migration module 1702 migrates the determined UE to the standby SMF. If a UE migration range is set to all UEs, the migration module 1702 migrates all UEs on the active SMF to the standby SMF. If the UE migration range is set to UEs within a specified range, the migration module 1702 migrates specified UEs on the active SMF to the standby SMF. If the UE migration range is set to an unspecified range, the migration module 1702 migrates randomly determined UEs to the standby SMF according to a local policy, where the randomly determined UEs may be all or part of the UEs.

In addition, in the embodiment of the present application, the manner in which the migration module 1702 migrates the UE on the active SMF further includes, but is not limited to, three manners described below.

In manner one, the migration module 1702 updates the SMF information on the NF according to the context information of the UE in units of single UE.

In some implementations of this embodiment, the operation in which the migration module 1702 updates the SMF information on the NF according to the context information of the UE in units of single UE includes at least one of operations described below. The migration module 1702 sends the N4 session update request to a User Plane Function (UPF) according to the context information of the UE to update the SMF information on the UPF, where the N4 session update request includes an SMF replacement indication and the information about the active SMF. The migration module 1702 sends an SMF registration update request to a unified data management (UDM) function according to the context information of the UE to update the SMF information on the UDM, where the SMF registration update request includes an SMF replacement indication and the information about the active SMF. The migration module 1702 sends an SM session state update request to an AMF according to the context information of the UE to update the SMF information on the AMF, where the SM session state update request includes an SMF replacement indication and the information about the active SMF. The migration module 1702 sends an SM policy update request to a Policy Control Function (PCF) according to the context information of the UE to update the SMF information on the PCF, where the SM policy update request includes an SMF replacement indication and the information about the active SMF.

In manner two, the migration module 1702 updates the SMF information on the NF according to the context information of the UE in units of single NF.

In some implementations of this embodiment, the operation in which the migration module 1702 updates the SMF information on the NF according to the context information of the UE in units of single NF includes at least one of operations described below. The migration module 1702 sends an NF replacement request to each UPF according to the context information of the UE to update the SMF information on the UPF, where the NF replacement request includes the SMF replacement indication and the information about the active SMF. The migration module 1702 sends an NF replacement request to each UDM according to the context information of the UE to update the SMF information on the UDM, where the NF replacement request includes the SMF replacement indication and the information about the active SMF. The migration module 1702 sends an NF replacement request to each AMF according to the context information of the UE to update the SMF information on the AMF, where the NF replacement request includes the SMF replacement indication and the information about the active SMF. The migration module 1702 sends an NF replacement request to each PCF according to the context information of the UE to update the SMF information on the PCF, where the NF replacement request includes the SMF replacement indication and the information about the active SMF.

In manner three, the migration module 1702 updates a packet data unit (PDU) session according to the context information of the UE in units of single UE so that the SMF information on the NF is updated.

In some implementations of this embodiment, when the migration module 1702 uses single UE as the unit, the migration module 1702 sends an N1/N2 Message Transfer Request to the AMF according to the context information of the UE, where the N1/N2 Message Transfer Request includes a PDU session update request, so that the AMF sends the PDU session update request to the UE to update the PDU session.

According to the UE migration system provided by the embodiment of the present application, in some implementations, the NF that establishes the signaling interaction with the SMF acquires the link state between the NF and the SMF, the NF sends the SMF failure notification message to the standby SMF in response to determining that the active SMF fails, and the standby SMF migrates the UE on the active SMF to the standby SMF according to the received SMF failure notification message, which can effectively avoid the case where the failure of the SMF results in the failure of the PDU session and the failure to normally transmit the uplink and downlink data of the UE. Moreover, the present application further provides a method for restoring UEs on the failed SMF to the standby SMF in batches, which can effectively save the overall time for SMF restoration.

Embodiment Five

Figure 18:
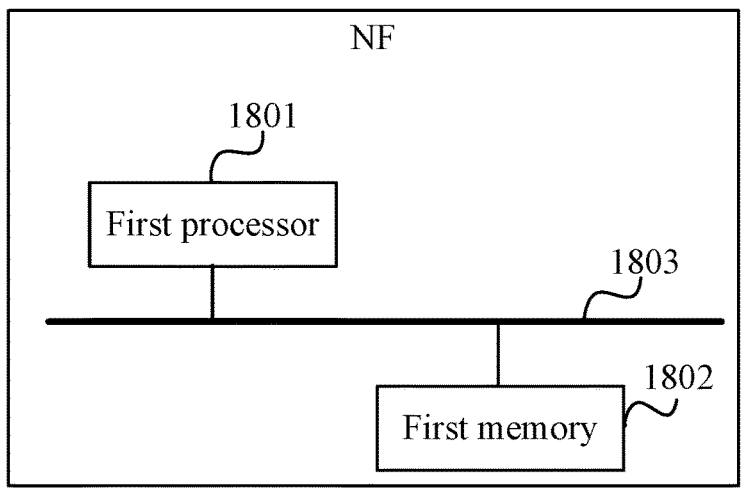
FIG. 18 is a structure diagram of an NF according to embodiment five of the present application.

An embodiment of the present application further provides an NF. As shown in FIG. 18, the NF includes a first processor 1801, a first memory 1802 and a first communication bus 1803. The first communication bus 1803 is configured to implement connections and communications between the first processor 1801 and the first memory 1802. The first processor 1801 is configured to execute one or more computer programs stored in the first memory 1802 to implement at least one step of the user equipment (UE) migration method applied to the NF in embodiment one described above.

Figure 19:
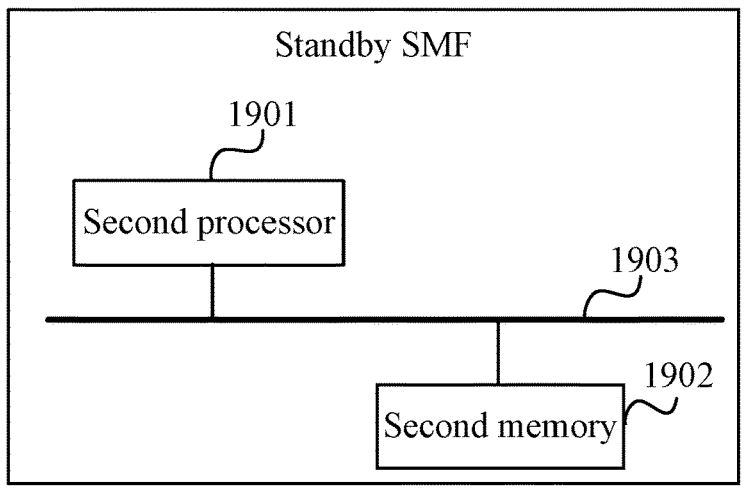
FIG. 19 is a structure diagram of a standby SMF according to embodiment five of the present application.

An embodiment of the present application further provides a standby SMF. As shown in FIG. 19, the standby SMF includes a second processor 1901, a second memory 1902 and a second communication bus 1903. The second communication bus 1903 is configured to implement connections and communications between the second processor 1901 and the second memory 1902. The second processor 1901 is configured to execute one or more computer programs stored in the second memory 1902 to implement at least one step of the user equipment (UE) migration method applied to the standby SMF in embodiment two described above.

Figure 20:
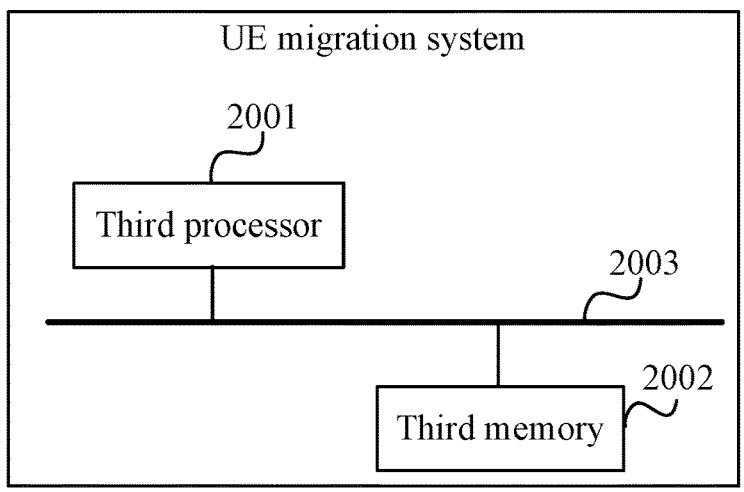
FIG. 20 is a structure diagram of a UE migration system according to embodiment five of the present application.

An embodiment of the present application further provides a user equipment (UE) migration system. As shown in FIG. 20, the UE migration system includes a third processor 2001, a third memory 2002 and a third communication bus 2003. The third communication bus 2003 is configured to implement connections and communications between the third processor 2001 and the third memory 2002. The third processor 2001 is configured to execute one or more computer programs stored in the third memory 2002 to implement at least one step of the user equipment (UE) migration method applied to the system including the NF and the standby SMF in embodiment three described above.

An embodiment of the present application further provides a computer-readable storage medium. The computer-readable storage medium includes volatile or nonvolatile, removable or non-removable media implemented in any method or technology for the storage of information (such as computer-readable instructions, data structures, computer program modules or other data). The computer-readable storage medium includes, but is not limited to, a random-access memory (RAM), a read-only memory (ROM), an electrically erasable programmable read-only memory (EEPROM), a flash memory, or other memory technologies, a compact disc read-only memory (CD-ROM), a digital versatile disc (DVD) or another optical disc storage, a magnetic cassette, a magnetic tape, disk storage or another magnetic storage apparatus, or any other medium that may be used for storing desired information and accessed by a computer.

The computer-readable storage medium in this embodiment may be configured to store one or more computer programs executable by a processor to implement at least one step of the user equipment (UE) migration methods in embodiment one and/or embodiment two and/or embodiment three described above.

This embodiment further provides a computer program which may be distributed on a computer-readable medium and executed by a computing apparatus to implement at least one step of the user equipment (UE) migration methods in embodiment one and/or embodiment two and/or embodiment three described above. In some circumstances, the at least one illustrated or described step may be executed in sequences different from those described in the embodiments described above.

This embodiment further provides a computer program product including a computer-readable apparatus on which the computer program illustrated above is stored. The computer-readable apparatus in this embodiment may include the computer-readable storage medium illustrated above.

It can be seen that those skilled in the art should understand that functional modules/units in all or part of the steps of the method, the system and the apparatus disclosed above may be implemented as software (which may be implemented by computer program codes executable by a computing apparatus), firmware, hardware, and appropriate combinations thereof. In the hardware implementation, the division of the functional modules/units mentioned in the above description may not correspond to the division of physical components. For example, one physical component may have multiple functions, or one function or step may be performed jointly by several physical components. Some or all physical components may be implemented as software executed by processors such as central processing units, digital signal processors or microcontrollers, may be implemented as hardware, or may be implemented as integrated circuits such as application-specific integrated circuits.

In addition, as is known to those of ordinary skill in the art, a communication medium generally includes computer-readable instructions, data structures, computer program modules, or other data in modulated data signals such as carriers or other transmission mechanisms and may include any information delivery medium. Therefore, the present application is not limited to any particular combination of hardware and software.

What is claimed is:

1. A method for wireless communication, performed by a User Plane Function (UPF), the method comprising:
   receiving, from an active Session Management Function (SMF), an N4 session establishment request message via a link between the UPF and the active SMF;
   in response to the N4 session establishment request message, establishing a session between the active SMF and the UPF, wherein the UPF is responsible for routing and forwarding of Internet Protocol (IP) data of a User Equipment (UE);
   transmitting a session establishment response message to the active SMF;
   determining a link state of the link between the UPF and the active SMF; and
   transmitting a notification message to a standby SMF in response to determining the link state is down, wherein:
      the notification message indicates to the standby SMF that the link between the UPF and the active SMF is down and triggers the standby SMF to initiate taking over the active SMF and migrating the UE from the active SMF to the standby SMF.

2. The method of claim 1, wherein the session is an N4 session and is associated with a Protocol Data Unit (PDU) session of a User Equipment (UE).

3. The method of claim 1, wherein determining the link state of the link between the UPF and the active SMF comprises:
   transmitting a heartbeat request to the active SMF; and
   in response to no reply to the heartbeat request being received from the active SMF, determining the link state of the link between the UPF and the active SMF as being down.

4. The method of claim 1, wherein determining the link state of the link between the UPF and the active SMF comprises:
   transmitting an N4 signaling to the active SMF; and
   in response to failure of transmitting the N4 signaling, determining the link state of the link between the UPF and the active SMF as being down.

5. The method of claim 1, wherein:
   before transmitting the notification message to the standby SMF in response to determining the link state is down, the method further comprises acquiring standby SMF information about the standby SMF; and
   after transmitting the notification message to the standby SMF in response to determining the link state is down, the method further comprises:
      in response to determining the link state is down, transmitting the notification message to the standby SMF according to the standby SMF information.

6. The method of claim 5, wherein the standby SMF information comprises at least one of a set identifier of the standby SMF, an instance identifier of the standby SMF, an SMF node identifier of the standby SMF, a callback Uniform Resource Identifier (URI) for SMF restoration of the standby SMF, N4 interface information of the standby SMF, or a correspondence between identifiers of standby SMFs and segment index identifiers (IDs), wherein the correspondence is used for indicating corresponding standby SMFs after UE context information on the active SMF is segmented and indexed.

7. The method of claim 1, wherein the notification message comprises at least one of an SMF instance identifier of the active SMF, an SMF node identifier of the active SMF, an SMF failure indication of the active SMF, or a UE migration range indication.

8. The method of claim 7, wherein the UE migration range indication comprises any one of: all UEs, UEs within a specified range, or UEs within a random range.

9. A User Plane Function (UPF) comprising a memory for storing computer instructions and a processor in communication with the memory, wherein, when the processor executes the computer instructions, the processor is configured to cause the UPF to:
receive, from an active Session Management Function (SMF), an N4 session establishment request message via a link between the UPF and the active SMF, wherein the UPF is responsible for routing and forwarding of Internet Protocol (IP) data of a User Equipment (UE);
in response to the N4 session establishment request message, establish a session between the active SMF and the UPF;
transmit a session establishment response message to the active SMF;
determine a link state of the link between the UPF and the active SMF; and
transmit a notification message to a standby SMF in response to determining the link state is down, wherein:
the notification message indicates to the standby SMF that the link between the UPF and the active SMF is down and triggers the standby SMF to initiate taking over the active SMF and migrating the UE from the active SMF to the standby SMF.

10. The UPF of claim 9, wherein the session is an N4 session and is associated with a Protocol Data Unit (PDU) session of a User Equipment (UE).

11. The UPF of claim 9, wherein, when the processor is configured to cause the UPF to determine the link state of the link between the UPF and the active SMF, the processor is configured to cause the UPF to:
transmit a heartbeat request to the active SMF; and
in response to no reply to the heartbeat request being received from the active SMF, determine the link state of the link between the UPF and the active SMF as being down.

12. The UPF of claim 9, wherein, when the processor is configured to cause the UPF to determine the link state of the link between the UPF and the active SMF, the processor is configured to cause the UPF to:
transmit an N4 signaling to the active SMF; and
in response to failure of transmitting the N4 signaling, determine the link state of the link between the UPF and the active SMF as being down.

13. The UPF of claim 9, wherein:
before the processor is configured to cause the UPF to transmit the notification message to the standby SMF in response to determining the link state is down, the processor is further configured to cause the UPF to acquire standby SMF information about the standby SMF; and
after the processor is configured to cause the UPF to transmit the notification message to the standby SMF in response to determining the link state is down, the processor is further configured to cause the UPF to:
in response to determining the link state is down, transmit the notification message to the standby SMF according to the standby SMF information.

14. The UPF of claim 13, wherein the standby SMF information comprises at least one of a set identifier of the standby SMF, an instance identifier of the standby SMF, an SMF node identifier of the standby SMF, a callback Uniform Resource Identifier (URI) for SMF restoration of the standby SMF, N4 interface information of the standby SMF, or a correspondence between identifiers of standby SMFs and segment index identifiers (IDs), wherein the correspondence is used for indicating corresponding standby SMFs after UE context information on the active SMF is segmented and indexed.

15. The UPF of claim 9, wherein the notification message comprises at least one of an SMF instance identifier of the active SMF, an SMF node identifier of the active SMF, an SMF failure indication of the active SMF, or a UE migration range indication.

16. The UPF of claim 15, wherein the UE migration range indication comprises any one of: all UEs, UEs within a specified range, or UEs within a random range.

17. A non-transitory storage medium for storing computer readable instructions, the computer readable instructions, when executed by a processor of a UPF, causing the processor to:
receive, from an active Session Management Function (SMF), an N4 session establishment request message via a link between the UPF and the active SMF, wherein the UPF is responsible for routing and forwarding of Internet Protocol (IP) data of a User Equipment (UE);
in response to the N4 session establishment request message, establish a session between the active SMF and the UPF;
transmit a session establishment response message to the active SMF;
determine a link state of the link between the UPF and the active SMF; and
transmit a notification message to a standby SMF in response to determining the link state is down, wherein:
the notification message indicates to the standby SMF that the link between the UPF and the active SMF is down and triggers the standby SMF to initiate taking over the active SMF and migrating the UE from the active SMF to the standby SMF.

18. The non-transitory storage medium of claim 17, wherein:
the notification message further triggers the standby SMF to take over the active SMF; and
when the computer readable instructions cause the processor to determine the link state of the link between the UPF and the active SMF, the computer readable instructions cause the processor to:
transmit a heartbeat request to the active SMF; and
in response to no reply to the heartbeat request being received from the active SMF, determine the link state of the link between the UPF and the active SMF as being down.

* * * * *